United States Patent
Ban et al.

(10) Patent No.: US 10,222,964 B2
(45) Date of Patent: Mar. 5, 2019

(54) OPERATION DEVICE AND OPERATION METHOD

(71) Applicant: Panasonic Intellectual Property Management Co., Ltd., Osaka-shi, Osaka (JP)

(72) Inventors: Yasuhiro Ban, Shiga (JP); Naoki Yamasaki, Shiga (JP); Hiromi Toyota, Kyoto (JP)

(73) Assignee: PANASONIC IP MANAGEMENT CO., LTD., Osaka (JP)

( * ) Notice: Subject to any disclaimer, the term of this patent is extended or adjusted under 35 U.S.C. 154(b) by 272 days.

(21) Appl. No.: 15/029,419

(22) PCT Filed: Oct. 21, 2014

(86) PCT No.: PCT/JP2014/005327
§ 371 (c)(1),
(2) Date: Apr. 14, 2016

(87) PCT Pub. No.: WO2015/059920
PCT Pub. Date: Apr. 30, 2015

(65) Prior Publication Data
US 2016/0253080 A1    Sep. 1, 2016

(30) Foreign Application Priority Data

Oct. 21, 2013  (JP) .................................. 2013-218085
Jul. 17, 2014  (JP) .................................. 2014-146443

(51) Int. Cl.
*G06F 3/00* (2006.01)
*G06F 13/00* (2006.01)
(Continued)

(52) U.S. Cl.
CPC .......... *G06F 3/04847* (2013.01); *F24C 7/086* (2013.01); *G06F 3/04883* (2013.01); *H05B 6/6435* (2013.01)

(58) Field of Classification Search
CPC ....... F24F 11/30; F24F 11/52; G06F 3/04847; G06F 3/04883
See application file for complete search history.

(56) References Cited

U.S. PATENT DOCUMENTS 5,279,134 A     1/1994  Nonogaki et al.
6,331,840 B1 *  12/2001  Nielson .................. G06F 3/0488
                                            345/1.1
(Continued)

FOREIGN PATENT DOCUMENTS

EP    2 189 724 A1    5/2010
JP    H05-168792 A    7/1993
(Continued)

OTHER PUBLICATIONS

Search Report, and English language translation thereof, in corresponding International Application No. PCT/JP2014/005327, dated Jan. 20, 2015, 3 pages.
(Continued)

*Primary Examiner* — Jordany Nunez
(74) *Attorney, Agent, or Firm* — Brinks Gilson & Lione

(57) ABSTRACT

An operation device is provided with a GUI display unit which displays a power setting value for defining an operation power of a household appliance, and a time setting value for defining an operation time of the household appliance on an orthogonal coordinate system; and a touch operation unit which simultaneously accepts an input of the power setting value and an input of the time setting value to be displayed on the GUI display unit by an operation of letting a predetermined object touch the GUI display unit.

8 Claims, 20 Drawing Sheets

(51) Int. Cl.
*G06F 3/048* (2013.01)
*G06F 3/041* (2006.01)
*G06F 3/0484* (2013.01)
*F24C 7/08* (2006.01)
*G06F 3/0488* (2013.01)
*H05B 6/64* (2006.01)

(56) References Cited

U.S. PATENT DOCUMENTS

| | | | |
|---|---|---|---|
| 6,799,712 B1 * | 10/2004 | Austen | B23K 1/008 219/413 |
| 7,114,554 B2 * | 10/2006 | Bergman | G05B 19/106 165/238 |
| 8,749,558 B2 * | 6/2014 | Tsai | G06F 3/0488 345/421 |
| 8,928,615 B2 * | 1/2015 | Meng | G06F 3/0488 178/18.01 |
| 2003/0208282 A1 * | 11/2003 | Shah | G05B 15/02 700/1 |
| 2009/0216383 A1 * | 8/2009 | Klinger | B60H 1/00985 700/278 |
| 2012/0003364 A1 | 1/2012 | Kling et al. | |
| 2013/0027412 A1 * | 1/2013 | Roddy | G04C 23/345 345/501 |
| 2013/0056457 A1 * | 3/2013 | Lee | F24C 7/083 219/620 |
| 2013/0263034 A1 * | 10/2013 | Bruck | F24F 11/0086 715/771 |
| 2014/0208957 A1 | 7/2014 | Imai et al. | |
| 2014/0340323 A1 * | 11/2014 | Jang | G06F 3/0416 345/173 |
| 2017/0185259 A1 * | 6/2017 | Chen | B64C 39/024 |

FOREIGN PATENT DOCUMENTS

| | | |
|---|---|---|
| JP | H09-264541 A | 10/1997 |
| JP | 2005-265216 A | 9/2005 |
| JP | 2010-081668 A | 4/2010 |
| WO | WO 2012/008475 A1 | 1/2012 |
| WO | WO 2012/008481 A1 | 1/2012 |

OTHER PUBLICATIONS

Supplementary Partial European Search Report in corresponding European Application No. 14856097.2 dated Nov. 28, 2016, 7 pages.

* cited by examiner

FIG. 21

| APPLIANCE NAME | POWER TO BE CONTROLLED |
|---|---|
| MICROWAVE OVEN | OUTPUT OF MICROWAVE ENERGY(W) |
| OVEN | HEATING POWER OR TEMPERATURE |
| IH COOKING HEATER | HEATING POWER OR TEMPERATURE |
| RICE COOKER | HEATING POWER OR TEMPERATURE |
| MIXER | ROTATIONAL SPEED |
| WASHING MACHINE | ROTATIONAL SPEED (WASHING TUB), WATER AMOUNT, OR WATER TEMPERATURE |
| DRYING MACHINE | OUTPUT OR TEMPERATURE OF HEATER |
| VACUUM CLEANER | SUCTION POWER |
| DISH WASHER | WATER AMOUNT OR WATER TEMPERATURE |
| AIR CONDITIONER | TEMPERATURE OF AIR VOLUME |
| MASSAGE CHAIR | LEVEL OF MASSAGE |

OPERATION DEVICE AND OPERATION METHOD

This application is a 371 application of PCT/JP2014/005327 having an international filing date of Oct. 21, 2014, which claims priority to JP 2013-218085 filed Oct. 21, 2013 and JP 2014-146443 filed Jul. 17, 2014. The entire contents of the three applications are incorporated herein by reference.

TECHNICAL FIELD

The present invention relates to an operation device and an operation method for operating a household appliance.

BACKGROUND ART

A conventional display device provided with a display unit including a touch panel is configured as follows. A plurality of images representing a plurality of alternatives are simultaneously displayed on a screen of the display unit. The user is allowed to successively touch a first image located at a first display position representing a first alternative, as one of the images, and a second image located at a second display position representing a second alternative, as the other one of the alternatives by the finger or by a pen-like object. When a changeover operation signal representing that the finger or the pen-like object successively touches the first image and the second image is received from the touch panel, the first image representing the first alternative and the second image representing the second alternative are changed over to display the first image at the second display position and to display the second image at the first image display position (see e.g. Patent Literature 1). According to this configuration, the user can easily re-arrange the order of display of the alternatives displayed on the display unit by a simple operation of touching the touch panel by the user's finger or by a pen-like object.

Further, generally, in many household appliances, it is often the case that the user inputs power settings and/or time settings with respect to an object to be handled by way of a switch when the user operates the household appliances by manual settings according to the user's preference.

Specifically, when the user uses a microwave function of a microwave oven, the user performs a microwave output setting, which is one of the power settings, and then performs a time setting to start microwave cooking. Further, when the user uses an oven function of the microwave oven, the user performs an oven temperature setting (normally from 150 to 300° C.), which is one of the power settings, and then performs a time setting to start oven cooking.

In the conventional display device, the display device is provided with a display unit including a touch panel, a plurality of images representing a plurality of alternatives are displayed on a screen of the display unit, and the user is allowed to successively touch the first image and the second image by the finger or by a pen-like object for facilitating the operation of changing over the first image and the second image. However, it is difficult for the user to perform power settings such as adjustment of heating power or output of microwave, and time settings with a simplified operation and with a less number of operations when the user uses the oven function or the microwave function of manual operations of a cooking heater.

CITATION LIST

Patent Literature

Patent Literature 1: International Unexamined Patent Publication No. 2012/008475

SUMMARY OF INVENTION

In view of the above, an object of the invention is to provide an operation device and an operation method that enable to enhance the usability of the user.

An operation device according to an aspect of the invention is an operation device for operating a household appliance. The operation device is provided with a display unit which displays a power setting value for defining an operation power of the household appliance, and a time setting value for defining an operation time of the household appliance on an orthogonal coordinate system; and an operation unit which simultaneously accepts an input of the power setting value and an input of the time setting value to be displayed on the display unit by an operation of letting a predetermined object touch the display unit.

According to the invention, the user can easily set the power setting value for defining the operation power of the household appliance and the time setting value for defining the operation time of the household appliance with a less number of operations. This is advantageous in enhancing the usability of the user.

BRIEF DESCRIPTION OF THE DRAWINGS

FIG. 21 is a diagram illustrating an example of a power setting value to be controlled by each of the household appliances.

DETAILED DESCRIPTION OF THE PREFERRED EMBODIMENTS

Figure 1:
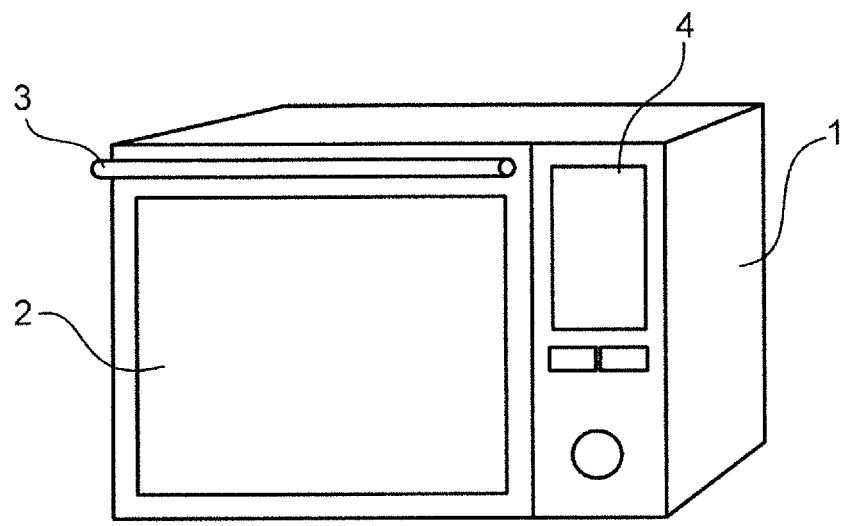
FIG. 1 is a diagram illustrating an external appearance of a microwave oven in a first embodiment of the invention.

In the following, embodiments of the invention are described referring to the drawings. The invention, however, is not limited by the embodiments. Further, the same constituent elements throughout the drawings are indicated by the same reference signs, and repeated description thereof is omitted.

(First Embodiment)

Figure 2:
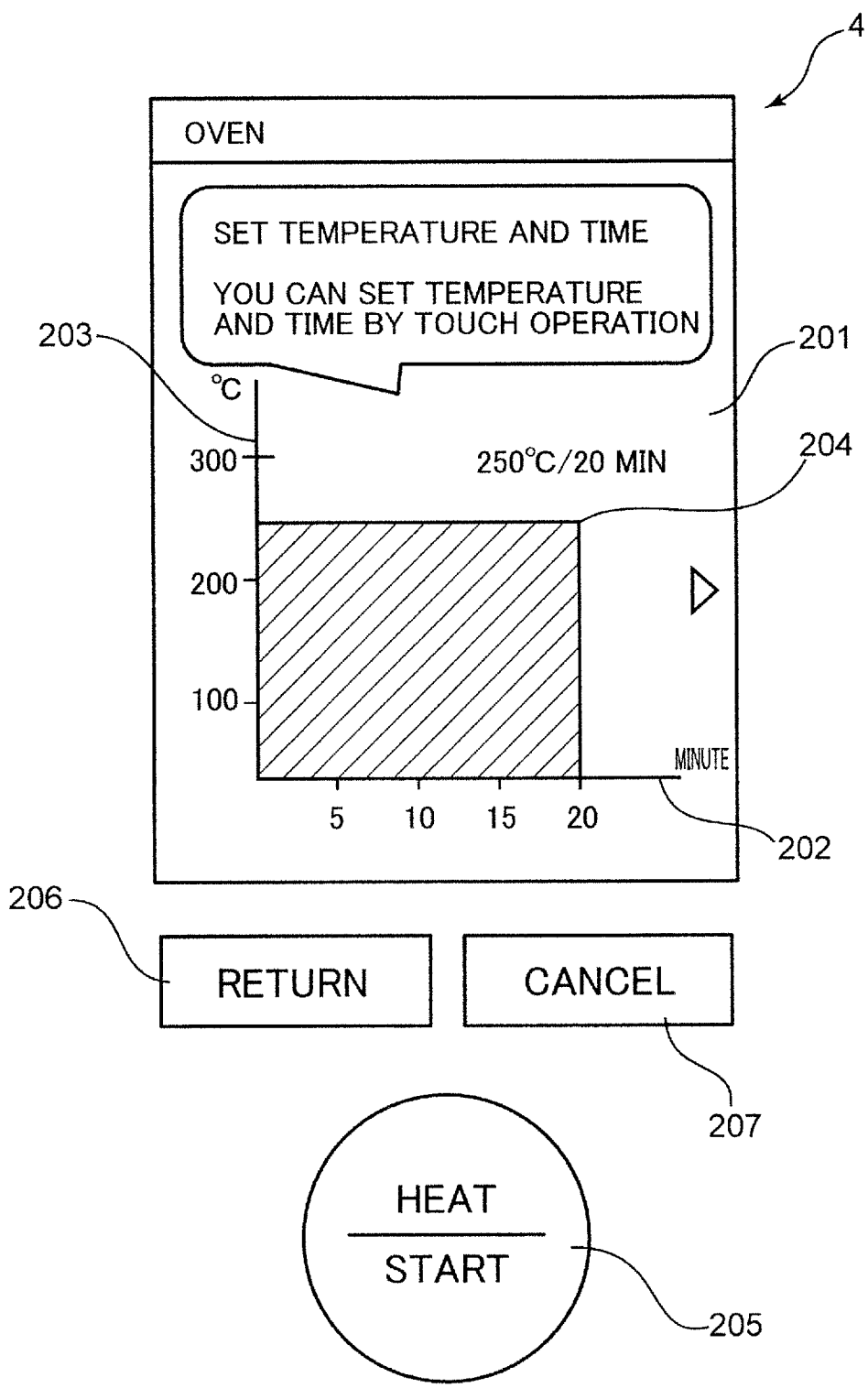
FIG. 2 is a diagram illustrating a configuration of an operation display unit of the microwave oven in the first embodiment of the invention.
Figure 3:
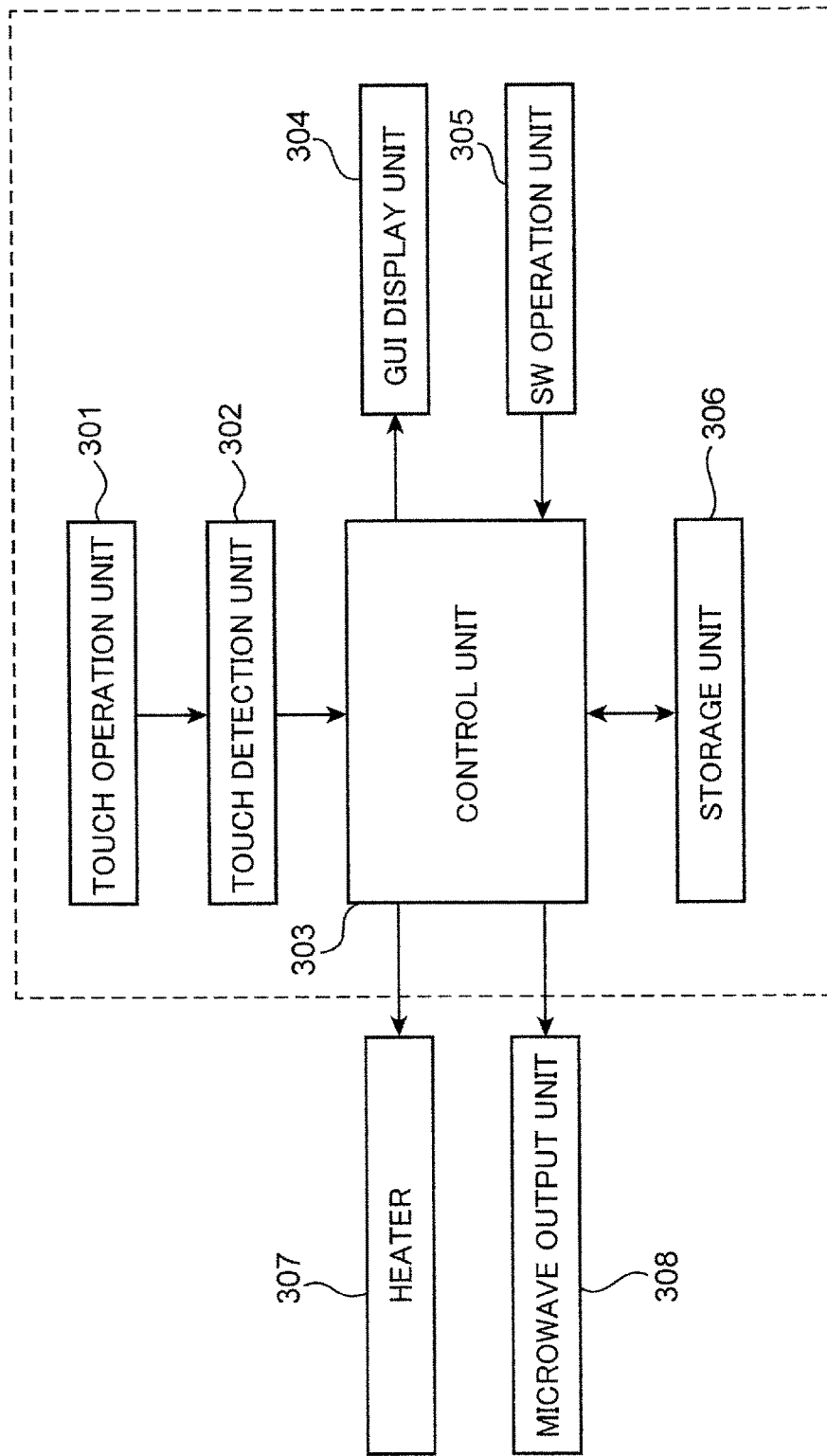
FIG. 3 is a block configuration diagram illustrating a configuration of the operation display unit in the first embodiment of the invention.

FIG. 1 is a diagram illustrating an external appearance of a microwave oven in the first embodiment of the invention. FIG. 2 is a diagram illustrating a configuration of an operation display unit of the microwave oven in the first embodiment of the invention. FIG. 3 is a block diagram illustrating a configuration of the operation display unit in the first embodiment of the invention. The configuration of the first embodiment is described using FIG. 1, FIG. 2, and FIG. 3. In the first embodiment, a microwave oven is described as an example of a household appliance provided with an operation device. The household appliance, however, is not limited to a microwave oven.

Referring to FIG. 1, the microwave oven is provided with a microwave oven housing 1, a door 2, a door handle 3, and an operation display unit 4. The microwave oven is an example of a cooking heater for heating food.

The microwave oven in the first embodiment is a microwave oven provided with a microwave cooking function of heating food by microwave energy, an oven cooking function of heating food by a heater, and a steam cooking function of heating food by utilizing steam. The user puts the food in the interior of the microwave oven by opening the door 2, which is provided on the front surface of the microwave oven housing 1 as an outer casing of the microwave oven, and heat cooking is performed after the door 2 is closed. The user can put the food to be cooked through the opening formed in the front surface of the microwave oven by gripping the door handle 3 provided on the door 2 and pulling the door handle 3 forward.

After the user puts the food to be cooked in the interior of the microwave oven, the user operates the operation display unit 4, and performs settings and issues instructions for cooking the food. Although the details are not illustrated, when the door 2 is opened, the power supply of the microwave oven is turned on. The user is allowed to switch between the modes such as a manual operation or an automatic menu by operating the operation display unit 4, and performs cooking settings. When a start key is pressed, cooking is started. When the cooking is finished, the microwave oven stops heating.

Further, in the manual operation, when one of the heating menus such as microwave cooking, oven cooking, grill cooking, or steam cooking (heating the food by steam and steaming the food) is selected, a heating power and a heating time are set, and cooking is performed.

Specifically, when cooking is performed by using a microwave function, an output power (W) of microwave energy, and a time are set. When cooking is performed by using an oven function, a temperature (° C.) and a time are set, and cooking started. When cooking is performed by using a grill function or a steam function, a time is set, and cooking is started. Further, when cooking is performed by using an oven function or a grill function, the position of placing a baking dish is set.

The automatic menu is a function of combining the heating functions of the microwave oven such as a microwave function, an oven function, a fermentation function, a grill function, and a steam function, and performing automatic heat cooking in accordance with a set cooking menu.

Specifically, the user operates the operation display unit 4, selects a cooking menu such as cooking hamburger patties from the automatic menu function provided in the microwave oven, and presses the start key to start cooking.

The operation display unit 4 in the first embodiment is composed of a full-dot liquid crystal display which displays a graphical user interface (hereinafter, called as GUI), and a capacitance type touch panel provided on the full-dot liquid crystal display. The operation display unit 4 detects touch of the user's finger, determines the touch position, accepts a user's pressing a button expressed by GUI at the determined position, and issues an instruction to the microwave oven.

Next, an external appearance configuration of the operation display unit 4 is described using FIG. 2. The operation display unit 4 illustrated in FIG. 2 is provided with a GUI operation display portion 201, a start key 205, a return key 206, and a cancel key 207. A time setting axis 202, a temperature setting axis 203, and a touch point 204 are displayed on the GUI operation display portion 201.

The GUI operation display portion 201 is composed of a full-dot liquid crystal display and a capacitance type touch panel. A heating time and a heating temperature are displayed in the form of a graph, while using the time setting axis 202 as a horizontal axis and using the temperature setting axis 203 as a vertical axis. The user touches the touch point 204 to be described later, and sets a heating time and a heating temperature of the microwave oven.

The time setting axis 202 is a coordinate axis for use in time settings to be displayed on the GUI operation display portion 201. Scales such as 5, 10, 15, 20 (MIN) are formed on the time setting axis 202. Further, when the user intends to display the scales in a right region adjacent to the right end of the time setting axis 202, specifically, intends to display the times longer than 20 MIN illustrated in FIG. 2, the user is allowed to scroll the graph portion. The scales differ depending on a heating mode such as a microwave function, an oven function, a grill function, a steam function, or a fermentation function. It is possible to change the fineness of scale (not illustrated).

The temperature setting axis 203 is a coordinate axis for use in temperature settings to be displayed on the GUI operation display portion 201. Scales such as 100, 200, and 300 (° C.) are formed on the temperature setting axis 203. Further, when the user intends to display the scales in an upper region adjacent to the upper end of the temperature setting axis 203, specifically, intends to display the temperatures higher than 300° C. illustrated in FIG. 2, the user is allowed to scroll the graph portion.

The scales differ depending on a heating mode such as a microwave function, an oven function, a grill function, a steam function, or a fermentation function. When the heating mode is an oven function or a fermentation function, the scales represent temperatures. When the heating mode is a microwave function, the scales represent output powers (W) of microwave energy.

The touch point 204 is an intersection point between a temperature setting value and a time setting value to be displayed on the GUI operation display portion 201. The touch point 204 is an intersection point between a straight line extending from a temperature setting value on the temperature setting axis 203 in a direction perpendicular to the temperature setting axis 203, and a straight line extending from a time setting value on the time setting axis 202 in a direction perpendicular to the time setting axis 202. The touch point 204 is touched by the user's finger, and is dragged upward, downward, leftward, rightward, or in an oblique direction. Thus, two setting values are changed sequentially and simultaneously. When the finger is released (detached) from the touch point 204, the two setting values are determined. When the user drags the touch point 204 rightward, and the touch point 204 comes to the right end of the graph, the user is allowed to scroll the scale portion of the time setting axis 202.

Further, the user can instantaneously change the temperature setting value and the time setting value without sequentially changing the temperature setting value and the time setting value by touching the currently displayed graph-like setting map. Specifically, the GUI operation display portion 201 is configured such that when the user touches an arbitrary position within the currently displayed orthogonal coordinate system, the touch point 204 may be moved to the touch position.

Displaying the area surrounded by a line perpendicularly extending from the time setting axis 202 to the touch point 204, and a line perpendicularly extending from the temperature setting axis 203 to the touch point 204 with a color different from the color of the area in the vicinity of the area makes it easy for the user to recognize the time setting value and the temperature setting value. Further, displaying the area surrounded by a line perpendicularly extending form the time setting axis 202 to the touch point 204, and a line perpendicularly extending from the temperature setting axis 203 to the touch point 204 in the form of a graph makes it easy for the user to intuitively recognize the setting values of the currently executed function.

Further, in the embodiment, the GUI operation display portion 201 displays an initial setting value of the temperature setting value and an initial setting value of the time setting value by a rectangular area with a color different from the color of the area in the vicinity of the area. The initial setting values may not be displayed. The GUI operation display portion 201 may be configured such that when the user touches an arbitrary position on the currently displayed graph-like setting map, the initial setting values are displayed.

In the embodiment, the touch point 204 indicates an intersection point between a temperature setting value and a time setting value. Alternatively, a marker button (to be described later) may be displayed at the position of the touch point 204 to make it easy for the user to recognize the touch point 204 operable by the user. Further alternatively, the GUI operation display portion 201 may display a marker button only when a touch operation is performed. Means for implementing the touch point 204 is not specifically limited, as far as it is possible to configure an operation portion touchable by the user for changing a temperature setting value and a time setting value.

Further, when a touch panel can detect proximity of a finger, the GUI operation display portion 201 may display a marker button when proximity of a finger is detected.

The start key 205 is a button for use in starting heat cooking by the temperature setting value and the time setting value that are set and determined on the GUI operation display portion 201.

The return key 206 is a button for use in returning a GUI display to be shifted on the GUI operation display portion 201 or a setting determined on the GUI operation display portion 201 to the immediately preceding setting, and is a button for use in returning a currently displayed screen to the immediately preceding screen.

The cancel key 207 is a button for use in canceling setting values that are successively set on the GUI operation display portion 201, or a button for use in stopping a heating operation after the heating operation is started.

The start key 205, the return key 206, and the cancel key 207 are composed of independent keys such as tact switches or capacitance type touch switches.

Next, a functional configuration of the operation display unit 4 is described using FIG. 3.

The operation display unit 4 is provided with a touch operation unit 301, a touch detection unit 302, a control unit 303, a GUI display unit 304, a switch (SW) operation unit 305, a storage unit 306, a heater 307, and a microwave output unit 308. These constituent elements are cooperated with each other to implement the constituent elements as the operation display unit 4.

The operation display unit 4 is provided with, as hardware components, a microcomputer, a full-dot liquid crystal display, a capacitance type touch panel, a capacitance type touch sensor IC (Integrated Circuit), and switches. The hardware components, and software components which operate the microcomputer are cooperated with each other.

The touch operation unit 301 is composed of e.g. a capacitance type touch panel. When the user's finger touches the touch panel, the electrostatic capacitance changes, and a change in the electrostatic capacitance is detected by the touch detection unit 302 to be described later.

The touch detection unit 302 is a sensor IC which detects a change in the electrostatic capacitance of the touch operation unit 301. The touch detection unit 302 outputs a detected amount of change in the electrostatic capacitance and a detected coordinate.

The control unit 303 is composed of a microcomputer and software components, and acquires detection information of various sensors, and setting values of the operation display unit 4. As described in the embodiment, when an operation device (operation display unit 4) is installed in a microwave oven, the control unit 303 drives a magnetron which outputs microwave energy for heating, or drives a heater which heats the interior of the microwave oven, and controls the microwave oven. The microcomputer composing the control unit 303 may be one or more.

The GUI display unit 304 is composed of e.g. a full-dot liquid crystal display. The control unit 303 generates a GUI image to be rendered in a video RAM (Random Access Memory), and outputs the generated GUI image to the liquid crystal display (GUI display unit 304) at a predetermined timing interval. The GUI display unit 304 displays the GUI image output by the control unit 303.

The GUI display unit 304 displays a power setting value for defining an operation power of the household appliance, and a time setting value for setting an operation time of the household appliance on an orthogonal coordinate system. The touch operation unit 301 simultaneously accepts an input of a power setting value and an input of a time setting value to be displayed by the GUI display unit 304 by an operation of letting a predetermined object touch the GUI display unit 304. The predetermined object is a finger or a touch pen. The predetermined object may be a variety of objects whose touch on the GUI display unit 304 is detected by the touch detection unit 302.

Further, one of the vertical axis and the horizontal axis on the orthogonal coordinate system represents a power setting value, and the other of the vertical axis and the horizontal axis represents a time setting value. The touch operation unit 301 simultaneously accepts an input of a power setting value and an input of a time setting value by a user's operation of dragging an intersection point between the power setting value and the time setting value on the orthogonal coordinate system.

The SW operation unit 305 is composed of e.g. tact switches (SW). The SW operation unit 305 is composed of a start key for use in designating start of a heating operation, a return key for use in returning a currently displayed screen to the immediately preceding screen, and a cancel key for use in canceling the input contents or stopping a heating operation.

The storage unit 306 is composed of a memory such as an ROM (Read Only Memory) or an RAM. The storage unit 306 stores a standard or default setting value frequently used for each heating mode (combination of a temperature setting value and a time setting value, or combination of an output setting value and a time setting value) or an arbitrary setting value frequently used by the user. The arbitrary setting value is stored in an RAM or in a rewritable ROM (e.g. a Flash ROM or an EEPROM) as necessary when the user operates the operation display unit 4.

The heater 307 is composed of a heater for heating in oven cooking. The control unit 303 controls the electric power to be supplied to the heater 307, and adjusts and controls the temperature in oven cooking.

The microwave output unit 308 is composed of a magnetron which outputs microwave energy for microwave cooking. The control unit 303 adjusts and controls the microwave energy to be output from the microwave output unit 308.

The operation device in the first embodiment is constituted by the touch operation unit 301, the touch detection unit 302, the control unit 303, the GUI display unit 304, the SW operation unit 305, and the storage unit 306 indicated by the dotted line portion in FIG. 3.

Next, an operation of setting and changing a temperature setting value and a time setting value by a drag operation in oven cooking by the microwave oven in the first embodiment is described.

Figure 4:
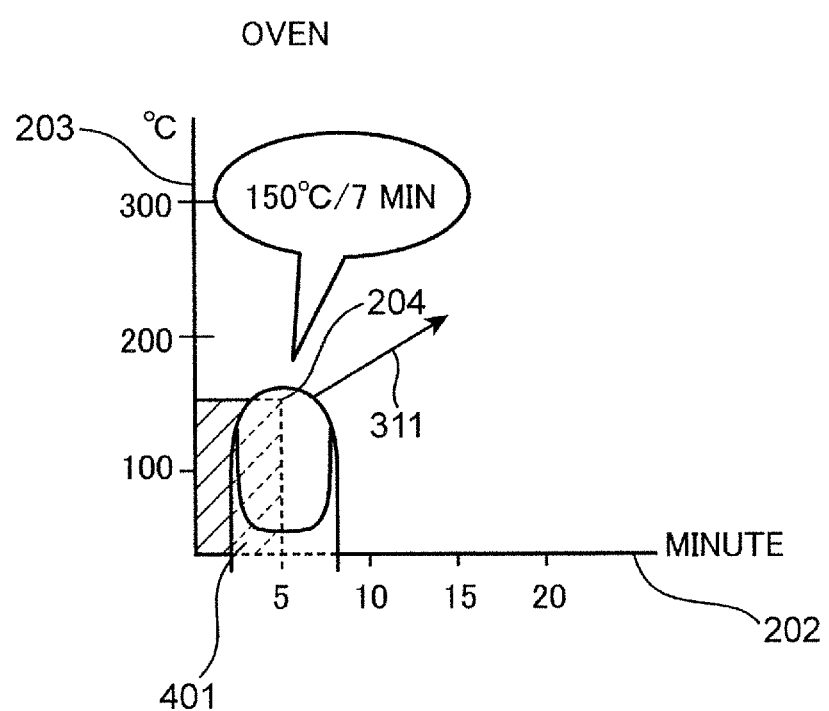
FIG. 4 is a diagram illustrating an example of a display screen before a temperature setting value and a time setting value in oven cooking by the microwave oven in the first embodiment are changed.
Figure 5:
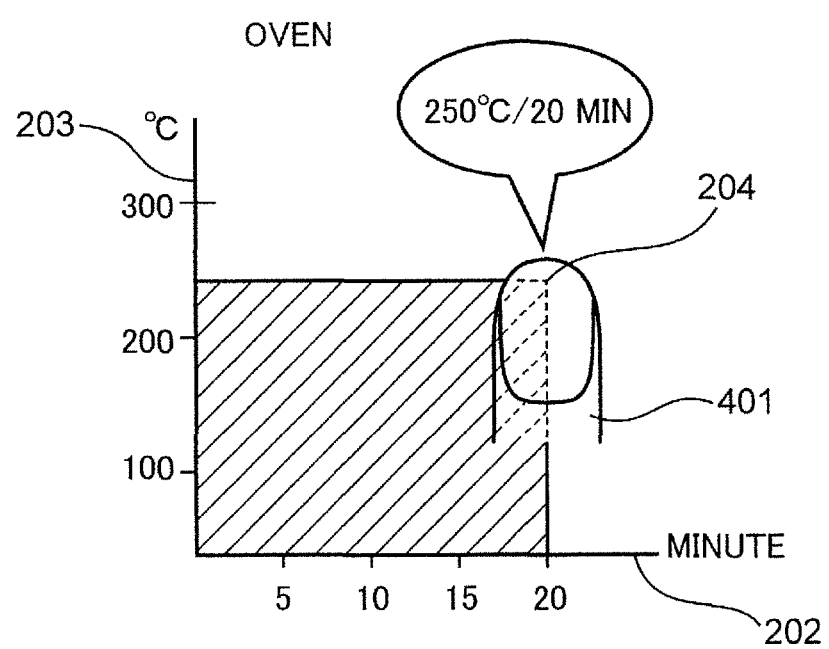
FIG. 5 is a diagram illustrating an example of a display screen after the temperature setting value and the time setting value in oven cooking by the microwave oven in the first embodiment are changed.
Figure 6:
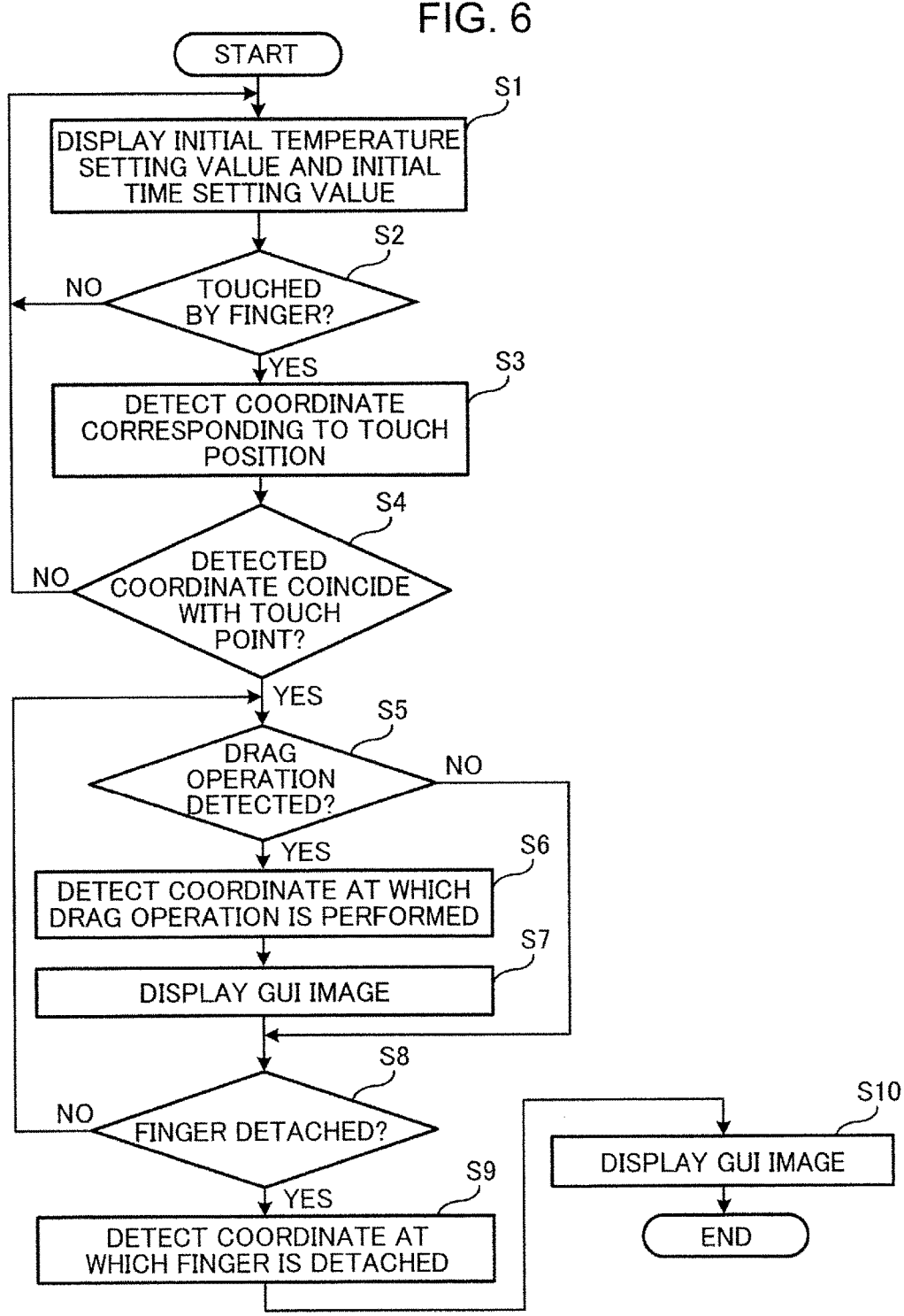
FIG. 6 is a flowchart for describing an operation of changing a temperature setting value and a time setting value by a drag operation in the first embodiment.

FIG. 4 is a diagram illustrating an example of a display screen before a temperature setting value and a time setting value in oven cooking by the microwave oven in the first embodiment are changed. FIG. 5 is a diagram illustrating an example of a display screen after the temperature setting value and the time setting value in oven cooking by the microwave oven in the first embodiment are changed. FIG. 6 is a flowchart for describing an operation of changing a temperature setting value and a time setting value by a drag operation in the first embodiment. An operation of changing a temperature setting value and a time setting value is described using FIG. 4 to FIG. 6.

In Step S1, the GUI display unit 304 displays an initial temperature setting value and an initial time setting value on an orthogonal coordinate system, in which the vertical axis represents a temperature setting value, and the horizontal axis represents a time setting value. The storage unit 306 stores in advance the initial temperature setting value and the initial time setting value. The control unit 303 reads the initial temperature setting value and the initial time setting value from the storage unit 306, generates a GUI image, in which the initial temperature setting value and the initial time setting value are displayed on the orthogonal coordinate system, and outputs the generated GUI image to the GUI display unit 304.

Then, the GUI display unit 304 displays the initial temperature setting value and the initial time setting value at a current point of time in the area surrounded by the time setting axis 202 and the temperature setting axis 203. In the embodiment, the initial temperature setting value is e.g. 150° C., and the initial time setting value is e.g. 7 minutes. The GUI display unit 304 displays a line perpendicularly extending from a point on the orthogonal coordinate system to be specified by the initial temperature setting value and the initial time setting value to the time setting axis 202, and a line perpendicularly extending from the point to the temperature setting axis 203.

When the temperature setting value and the time setting value in oven cooking are changed by the microwave oven, as illustrated in FIG. 4, the user touches the touch point 204 displayed in the area surrounded by the time setting axis 202 and the temperature setting axis 203 with a finger 401.

Subsequently, in Step S2, the touch detection unit 302 judges whether the user's finger touched the touch panel (touch operation unit 301). When the touch operation unit 301 is touched by the finger, the touch detection unit 302 detects a touch operation. When it is judged that the user's finger does not touch the touch panel (NO in Step S2), the routine returns to Step S1.

On the other hand, when it is judged that the user's finger touched the touch panel (YES in Step S2), in Step S3, the touch detection unit 302 detects the coordinate corresponding to the touch position, and outputs the detected coordinate to the control unit 303.

Subsequently, in Step S4, the control unit 303 judges whether the detected coordinate coincides with the coordinate of the current touch point 204 stored in the storage unit 306. The control unit 303 compares the coordinate of the current touch point 204 and the acquired coordinate corresponding to the touch position, and judges whether a predetermined area including the coordinate of the current touch point 204 stored in the storage unit 306 is touched. When it is judged that the detected coordinate does not coincide with the coordinate of the touch point 204 (NO in Step S4), the routine returns to Step S1.

On the other hand, when it is judged that the detected coordinate coincides with the coordinate of the touch point 204 (YES in Step S4), in Step S5, the touch detection unit 302 judges whether a drag operation is detected. A drag operation is a user's operation of moving the finger in contact with the touch panel. When the finger 401 drags the touch point 204, the touch detection unit 302 detects a drag operation. When a drag operation is not detected (NO in Step S5), the routine proceeds to Step S8.

On the other hand, when a drag operation is detected (YES in Step S5), in Step S6, the touch detection unit 302 detects a coordinate corresponding to the position at which a drag operation is performed, and outputs the detected coordinate to the control unit 303.

When the finger 401 drags the touch point 204 in the direction of the arrow 311 in FIG. 4, the touch detection unit 302 detects the coordinate on the touch operation unit 301 touched by the finger at a predetermined time interval (e.g. every several ten milliseconds), and outputs the detected coordinate to the control unit 303. The control unit 303 generates a GUI image in accordance with the acquired coordinate corresponding to the touch position. The control unit 303 generates a GUI image, in which the position touched by the user's finger and the position of the touch point 204 coincide with each other. The touch point 204 is moved as the user's finger moves. The line perpendicularly extending from the touch point 204 to the time setting axis 202, and the line perpendicularly extending from the touch point 204 to the temperature setting axis 203 also move, as the user's finger moves.

Subsequently, in Step S7, the GUI display unit 304 displays a GUI image generated by the control unit 303 at a timing interval for updating the screen. The user moves the finger 401 in contact with the screen to the position corresponding to a temperature and a time which the user intends to set, and releases the finger 401 at the position. The release operation is an operation of detaching the finger 401 from an operation object touched by the finger 401.

Subsequently, in Step S8, the touch detection unit 302 judges whether the finger 401 is detached from the screen. The touch detection unit 302 detects that the finger 401 is detached from the screen. When it is judge that the finger 401 is not detached from the screen (NO in Step S8), the routine returns to Step S5.

On the other hand, when it is judged that the finger 401 is detached from the screen (YES in Step S8), in Step S9, the touch detection unit 302 detects a coordinate corresponding to the position at which the finger 401 is detached from the screen. The touch detection unit 302 outputs release information indicating that the finger 401 is detached from the screen, and the coordinate corresponding to the position at which the finger 401 is detached from the screen to the control unit 303.

Subsequently, in Step S10, the control unit 303 generates a GUI image, in which the temperature setting value and the time setting value are changed as a result of movement of the touch point 204, and the GUI display unit 304 displays the GUI image generated by the control unit 303. For instance, as illustrated in FIG. 5, the GUI display unit 304 displays a GUI image, in which the temperature setting value is changed to 250° C., and the time setting value is changed to 20 minutes. Further, the control unit 303 simultaneously stores the changed temperature setting value and the changed time setting value in the storage unit 306.

Thereafter, the SW operation unit 305 accepts pressing of the start key 205. When the start key 205 is pressed, the control unit 303 controls a heating operation of the heater 307 for oven cooking at the temperature setting value and the time setting value stored in the storage unit 306.

In the embodiment, the area surrounded by a line perpendicularly extending from the time setting axis 202 to the touch point 204, and a line perpendicularly extending from the temperature setting axis 203 to the touch point 204 is displayed with a color different from the color of the area in the vicinity of the area. This makes it easy for the user to visually recognize "energy (temperature)×time" in heat cooking.

Next, an operation of setting and changing a temperature setting value and a time setting value when the user directly touches an arbitrary position in a touch operation area in oven cooking by the microwave oven is described.

Figure 7:
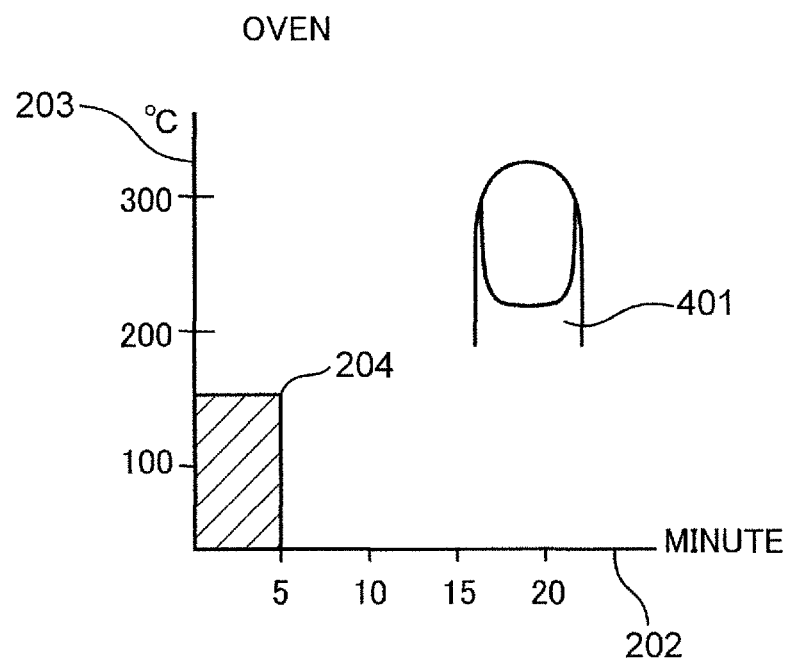
FIG. 7 is a diagram illustrating an example of a display screen before a temperature setting value and a time setting value in oven cooking by a microwave oven as a first modification of the first embodiment are changed.
Figure 8:
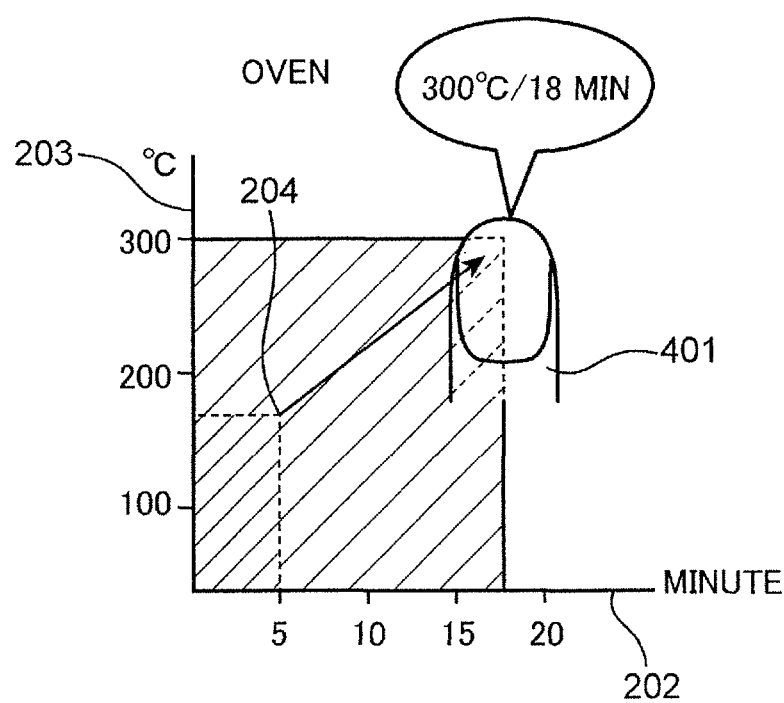
FIG. 8 is a diagram illustrating an example of a display screen after the temperature setting value and the time setting value in oven cooking by the microwave oven as the first modification of the first embodiment are changed.
Figure 9:
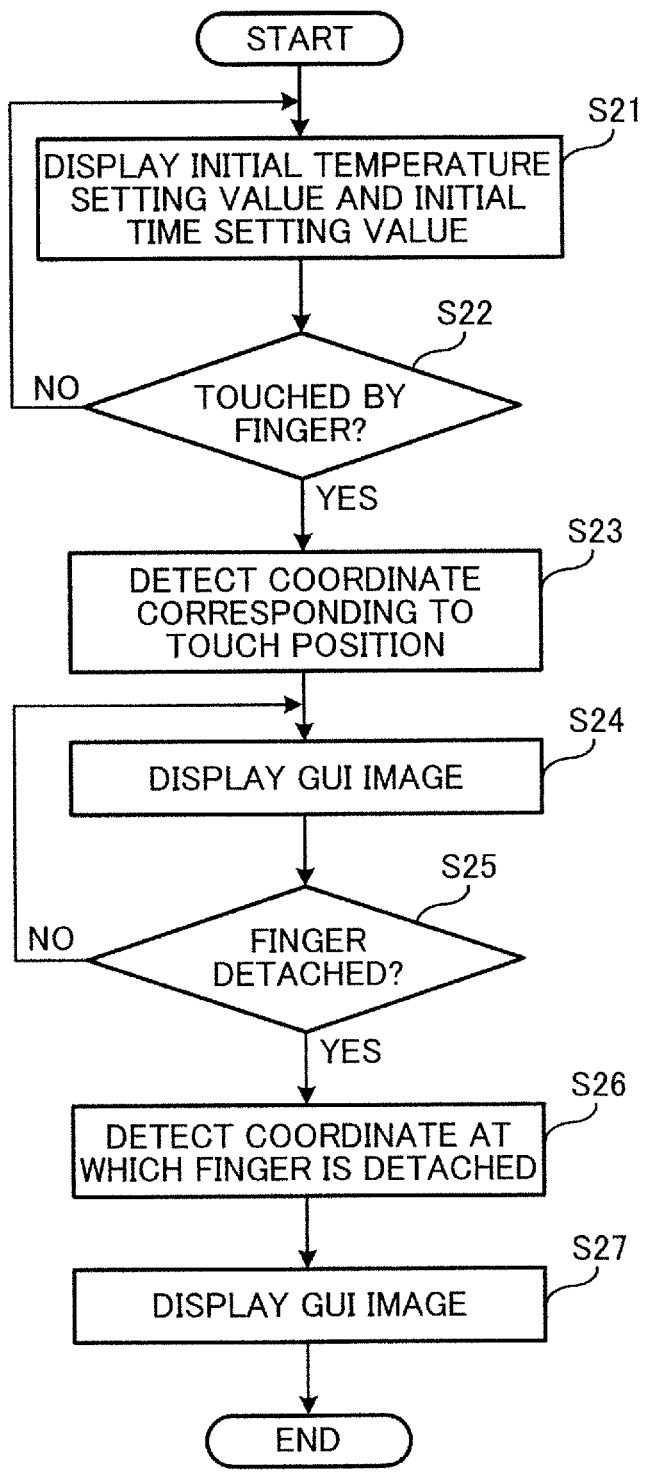
FIG. 9 is a flowchart for describing an operation of changing a temperature setting value and a time setting value by a touch operation in the first modification of the first embodiment.

FIG. 7 is a diagram illustrating an example of a display screen before a temperature setting value and a time setting value in oven cooking by a microwave oven as a first modification of the first embodiment are changed. FIG. 8 is a diagram illustrating an example of a display screen after the temperature setting value and the time setting value in oven cooking by the microwave oven as the first modification of the first embodiment are changed. FIG. 9 is a flowchart for describing an operation of changing a temperature setting value and a time setting value by a touch operation in the first modification of the first embodiment. An operation of changing a temperature setting value and a time setting value is described using FIG. 7 to FIG. 9.

The first modification of the first embodiment, and the first embodiment as described above are different in a point that in the first modification, a temperature setting value and a time setting value are changed by a one-time touch operation, without performing a drag operation.

One of the vertical axis and the horizontal axis on an orthogonal coordinate system represents a power setting value, and the other of the vertical axis and the horizontal axis represents a time setting value. A touch operation unit 301 simultaneously accepts an input of a power setting value and an input of a time setting value by a user's operation of touching an arbitrary position on the orthogonal coordinate system. A GUI display unit 304 displays a power setting value and a time setting value in such a manner that a position touched on the touch operation unit 301, and an intersection point between a power setting value and a time setting value coincide with each other.

In Step S21, the GUI display unit 304 displays an initial temperature setting value and an initial time setting value on an orthogonal coordinate system. A storage unit 306 stores in advance the initial temperature setting value and the initial time setting value. A control unit 303 reads the initial temperature setting value and the initial time setting value from the storage unit 306, generates a GUI image, in which the initial temperature setting value and the initial time setting value are displayed on the orthogonal coordinate system, and outputs the generated GUI image to the GUI display unit 304.

When the temperature setting value and the time setting value in oven cooking are changed, as illustrated in FIG. 7, the GUI display unit 304 of the microwave oven displays the initial temperature setting value and the initial time setting value at a current point of time. In FIG. 7, the initial temperature setting value is e.g. 150° C., and the initial time setting value is e.g. 5 minutes. The user touches, with a finger 401, a position near the position corresponding to an intended temperature setting value and an intended time setting value in a touch operation area surrounded by a time setting axis 202 and a temperature setting axis 203 displayed on the GUI display unit 304.

In the first modification of the first embodiment, the GUI display unit 304 displays the initial temperature setting value and the initial time setting value on the orthogonal coordinate system. The present disclosure, however, is not specifically limited. The GUI display unit 304 may display only the time setting axis 202 and the temperature setting axis 203, without displaying the initial temperature setting value and the initial time setting value.

Subsequently, in Step S2, a touch detection unit 302 judges whether the user's finger touched a touch panel (touch operation unit 301). When the touch operation unit 301 is touched by the finger 401, the touch detection unit 302 detects a touch operation. When it is judged that the user's finger does not touch the touch panel (NO in Step S22), the routine returns to Step S21.

On the other hand, when it is judged that the user's finger touched the touch panel (YES in Step S22), in Step S23, the touch detection unit 302 detects a coordinate corresponding to the touch position, and outputs the detected coordinate to the control unit 303.

Subsequently, in Step S24, the control unit 303 moves a touch point 204 as an intersection point between a temperature setting value and a time setting value to the detected coordinate corresponding to the touch position, reads setting value information (a temperature setting value and a time setting value) stored in the storage unit 306 in association with the coordinate, and generates a GUI image indicating the read temperature setting value and the read time setting value. The GUI display unit 304 displays the generated GUI image.

As illustrated in FIG. 8, the GUI display unit 304 moves the touch point 204 to the position touched by the finger 401, and displays a GUI image to prompt the user to present a temperature setting value (300° C.) and a time setting value (18 MIN) associated with the coordinate corresponding to the position touched by the finger 401.

Subsequently, in Step S25, the touch detection unit 302 judges whether the finger 401 is detached from the screen. When it is judged that the finger 401 is detached from the screen, the touch detection unit 302 detects that the finger 401 is detached from the screen. When it is judged that the finger 401 is not detached from the screen (NO in Step S25), the routine returns to Step S24.

On the other hand, when it is judged that the finger 401 is detached from the screen (YES in Step S25), in Step S26, the touch detection unit 302 detects the coordinate corresponding to the position at which the finger 401 is detached from the screen. The touch detection unit 302 outputs release information indicating that the finger 401 is detached from the screen, and the coordinate corresponding to the position at which the finger 401 is detached from the screen to the control unit 303.

Subsequently, in Step S27, the control unit 303 generates a GUI image, in which the temperature setting value and the time setting value are changed as a result of movement of the touch point 204, and the GUI display unit 304 displays the GUI image generated by the control unit 303. Further, when the finger 401 is detached from the screen, the control unit 303 stores the changed temperature setting value and the changed time setting value in the storage unit 306.

Thereafter, an SW operation unit 305 accepts pressing of a start key 205. After the temperature setting value and the time setting value are changed, and when the start key 205 is pressed, the control unit 303 controls a heating operation of a heater 307 for oven cooking at the temperature setting value and the time setting value stored in the storage unit 306.

In the first embodiment, an example of a heating operation using the oven mode is described. The aforementioned configuration is also applicable to a heating operation using a microwave mode or to a heating operation using a heating mode other than the above. When the heating mode is a microwave mode, an output setting value is set along the vertical axis, in place of a temperature setting value, and a heating operation of the microwave oven is set by combination of the output setting value and the time setting value.

Further, as illustrated in FIG. 4 or FIG. 7, the GUI display unit 304 displays current setting values (initial setting values) in a state (default state) before the user changes the setting values. Alternatively, current setting values (initial setting values) may not be displayed in a default state.

Figure 10:
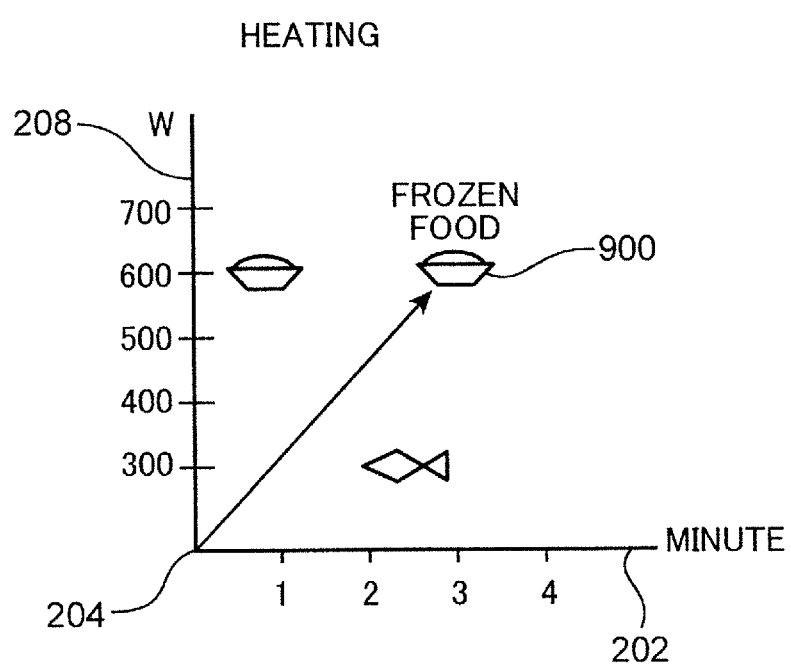
FIG. 10 is a diagram illustrating an example of a display screen before an output setting value and a time setting value of a microwave oven as a second modification of the first embodiment are changed.
Figure 11:
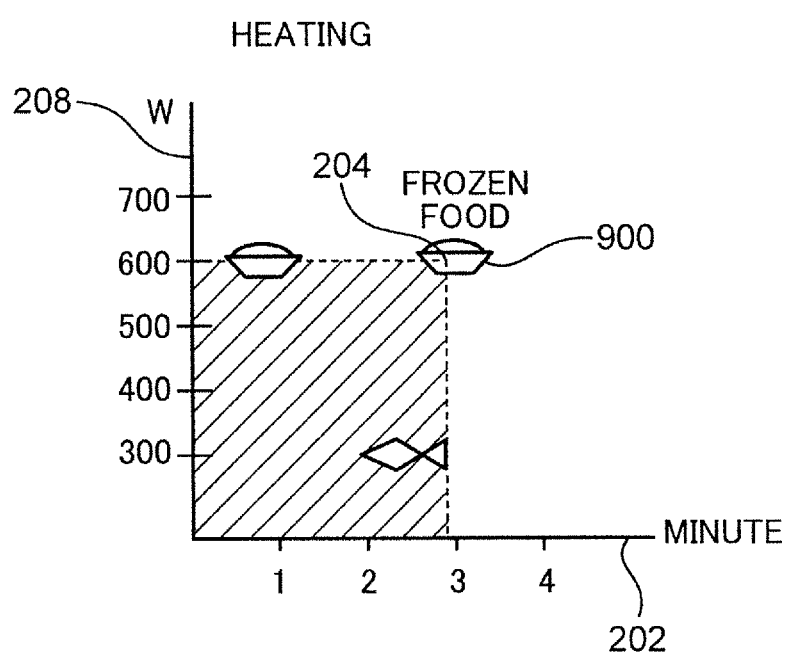
FIG. 11 is a diagram illustrating an example of a display screen after the output setting value and the time setting value of the microwave oven as the second modification of the first embodiment are changed.

FIG. 10 is a diagram illustrating an example of a display screen before an output setting value and a time setting value of a microwave oven as a second modification of the first embodiment are changed. FIG. 11 is a diagram illustrating an example of a display screen after the output setting value and the time setting value of the microwave oven as the second modification of the first embodiment are changed. In the second modification of the first embodiment, as illustrated in FIG. 10, a GUI display unit 304 may display an icon associated with a default setting value or a standard setting value (an output setting value and a time setting value) by mapping in a touch operation area surrounded by a time setting axis 202 and a temperature setting axis 203. This makes it easy for the user to set a setting value frequently used by the user.

The user drags a touch point 204 to the position of an intended icon among the icons to be displayed on a screen, or touches an intended icon among the icons to be displayed on a screen. According to this configuration, the user can set a heating operation of the microwave oven by a one-time operation. When one icon is displayed on a screen, the user drags the touch point 204 to the position of the icon to be displayed on the screen, or touches the icon to be displayed on the screen.

Specifically, as illustrated in FIG. 10, the position of the origin of an orthogonal coordinate system to be defined by an output setting axis 208 and the time setting axis 202 is set at the touch point 204. When frozen cooked rice is thawed and heated by heat cooking by the microwave oven, the user touches the touch point 204, drags the touch point 204 to a default setting value 900 (the output setting value: 600 W, the time setting value: 3 MIN) indicating frozen cooked rice, and detaches a finger 401 at the position corresponding to the default setting value 900. Then, as illustrated in FIG. 11, the user can set the touch point 204 to the setting value for frozen cooked rice.

Display of an icon associated with the default setting value 900 is switched by a user's operation of operating a touch operation unit 301 or an SW operation unit 305. The default setting value 900 is displayed in the form of an icon which clearly illustrates the food or the dish to be heated. This makes it easy for the user to recognize what kind of food is heated by the setting value.

Further, the touch operation unit 301 may be provided with a function of detecting proximity of the finger 401. The GUI display unit 304 may display an icon associated with the default setting value 900 when proximity of the finger 401 is detected. In this case, the GUI display unit 304 switches between display and non-display of an icon depending on the distance between the finger 401 and the touch operation unit 301.

Further, a storage unit 306 of the microwave oven may store an arbitrary setting value frequently used by the user. The GUI display unit 304 may display the arbitrary setting value stored in the storage unit 306 in a touch operation area. For instance, the GUI display unit 304 may display "an arbitrary setting value (700 W, 1 MIN)" in a touch operation area.

Figure 12:
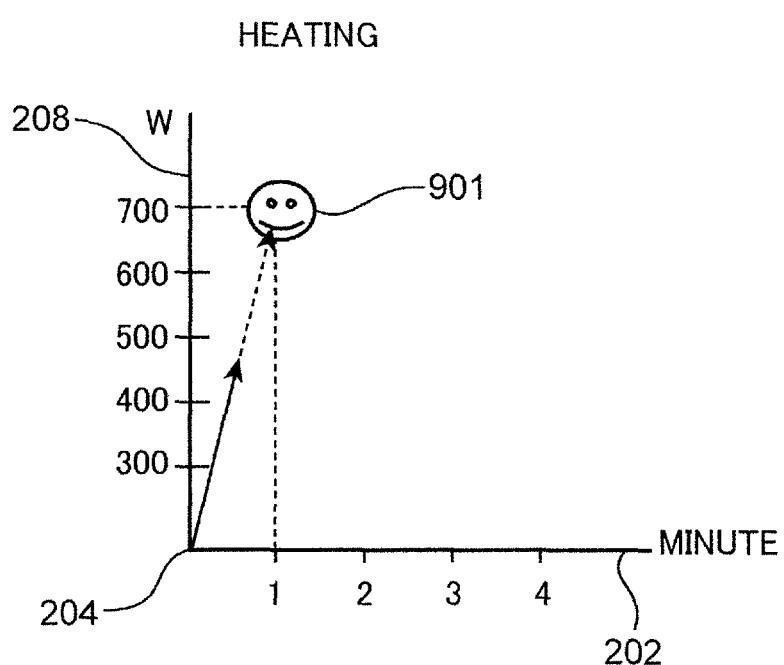
FIG. 12 is a diagram illustrating an example of a display screen before an output setting value and a time setting value of a microwave oven as a third modification of the first embodiment are changed.

FIG. 12 is a diagram illustrating an example of a display screen before an output setting value and a time setting value of a microwave oven as a third modification of the first embodiment are changed.

Specifically, as illustrated in FIG. 12, a GUI display unit 304 displays an icon associated with an arbitrary setting value 901 in a touch operation area. As well as the operation of the default setting value 900, the user drags a touch point 204 or touches the icon. This makes it easy for the user to set a setting value frequently used by the user.

Display of an icon associated with the arbitrary setting value 901 is switched by a user's operation of operating a touch operation unit 301 or an SW operation unit 305, as well as an operation of switching display of the default setting value 900. Since the arbitrary setting value 901 frequently used by the user is displayed as an icon, the user can intuitively recognize the arbitrary setting position. In FIG. 12, the GUI display unit 304 displays only one arbitrary setting value 901. Alternatively, the GUI display unit 304 may display two or more arbitrary setting values 901. Further, different icons may be used among the family members. This makes it easy for each of the users to clearly recognize and set an arbitrary setting value according to the user's preference.

Further, the touch operation unit 301 may be provided with a function of detecting proximity of a finger 401. When proximity of the finger 401 is detected, the GUI display unit 304 may display an icon associated with the arbitrary setting value 901. In this case, the GUI display unit 304 switches between display and non-display of an icon depending on the distance between the finger 401 and the touch operation unit 301. Further, the GUI display unit 304 may simultaneously display the default setting value 900 and the arbitrary setting value 901.

Further, the GUI display unit 304 may enlargedly display an icon associated with the default setting value 900 and an icon associated with the arbitrary setting value 901 when proximity of the finger 401 is detected. This makes it easy for the user to recognize the enlargedly displayed setting value. This is advantageous in enhancing the usability of the user.

Figure 13:
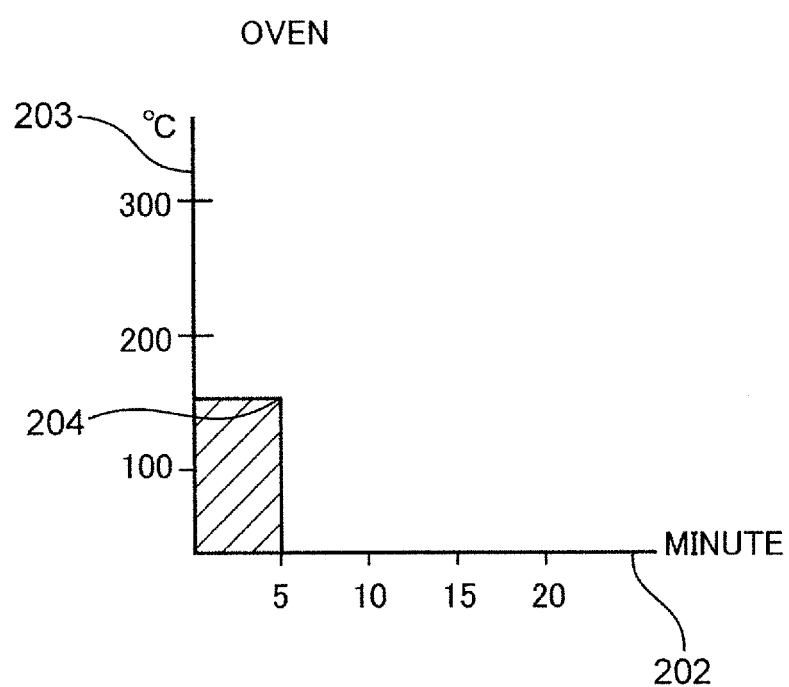
FIG. 13 is a diagram illustrating an example of a display screen to be normally displayed in changing a temperature setting value and a time setting value of an oven as a fourth modification of the first embodiment.
Figure 14:
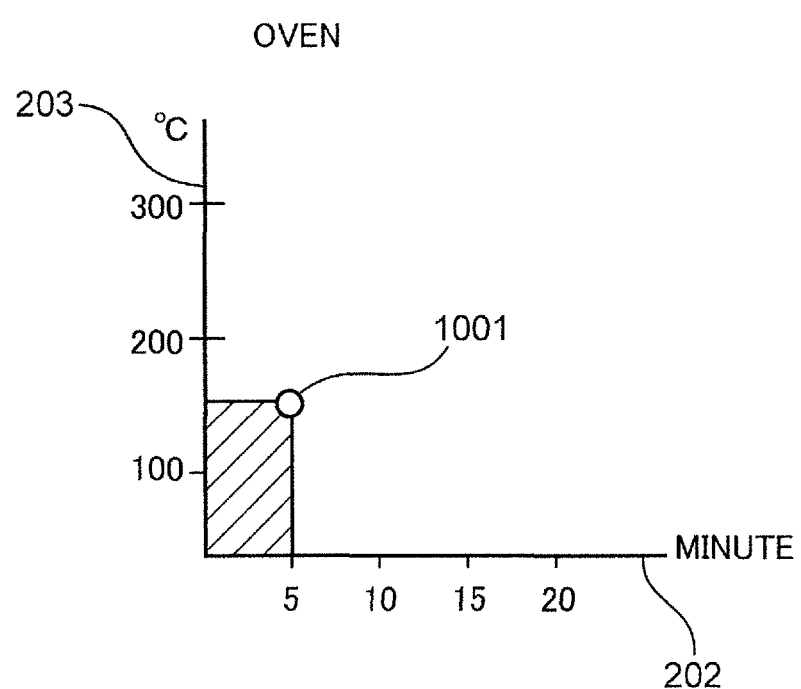
FIG. 14 is a diagram illustrating an example of a display screen to be displayed when proximity of the finger is detected in changing a temperature setting value and a time setting value of the oven as the fourth modification of the first embodiment.

FIG. 13 is a diagram illustrating an example of a display screen to be normally displayed in changing a temperature setting value and a time setting value of an oven as a fourth modification of the first embodiment. FIG. 14 is a diagram illustrating an example of a display screen to be displayed when proximity of a finger is detected in changing the temperature setting value and the time setting value of the oven as the fourth modification of the first embodiment.

When a display screen is normally displayed (when proximity of a finger is not detected), as illustrated in FIG. 13, a GUI display unit 304 displays an intersection point between a temperature setting value and a time setting value as a touch point 204. Alternatively, as illustrated in FIG. 14, a marker button 1001 of a round shape may be displayed at the position of the touch point 204 when proximity of a finger is detected. This makes it easy for the user to recognize a position at which a touch operation is performed.

Further, the marker button 1001 may be displayed in a blinking manner so that the user can easily recognize. The shape or the display method of the marker button 1001 is not limited to the above. The GUI display unit 304 displays the marker button 1001 when proximity of a finger to a touch operation unit 301 is detected, specifically, when the distance between the screen and the finger is about several millimeters to 10 millimeters; and erases the marker button 1001 when the finger is detached from the screen.

The GUI display unit 304 may display the round-shaped marker button 1001 at the position of the touch point 204 even when a display screen is normally displayed (when proximity of a finger is not detected).

In the first embodiment, a method for setting combination of a temperature and a time, or combination of an output and a time is described. Alternatively, it is possible to set combination of a parameter other than the above and a time. In this case, a GUI image similar to the above is displayed, and the parameter and the time are set by a touch operation (not illustrated).

As described above, according to the first embodiment, the GUI display unit 304 displays the time setting axis 202 in a horizontal direction, and displays the temperature setting axis 203 in a vertical direction. The touch operation unit 301 accepts a touch operation in a displayed touch operation area. According to this configuration, the user can simultaneously input a temperature setting value (or an output setting value) and a time setting value by a one-time touch operation in heat cooking. This makes it possible to reduce the number of setting operations of the microwave oven. This is advantageous in enhancing the operability and the usability of the user.

Further, the touch operation unit 301 allows for the user to simultaneously input a temperature setting value (or an output setting value) and a time setting value by a one-time drag operation. This allows for the user to simultaneously and easily set two parameters in heat cooking by the microwave oven, while allowing the user to visually check the setting and changing operations. This is advantageous in enhancing the operability and the usability of the user.

Further, the touch operation unit 301 allows for the user to simultaneously input a power and a time by accepting a touch operation to an arbitrary position on a bi-axial coordinate system composed of the time setting axis 202 and the temperature setting axis 203 (the output setting axis 208 in the microwave function). According to this configuration, the user can simultaneously change the temperature (or the output power) and the time in heat control of the microwave oven by directly touching the position corresponding to combination of intended setting values. This makes it possible to reduce the number of setting operations. This is advantageous in enhancing the operability and the usability of the user.

Further, the GUI display unit 304 displays an icon (image) associated with a default setting value, which is obtained by combining a temperature setting value and a time setting value in advance, on a bi-axial coordinate system composed of the time setting axis 202 and the temperature setting axis 203 (the output setting axis 208 in the microwave function). This makes it easy for the user to set parameters in exemplary heat cooking frequently used by the user. This is advantageous in enhancing the usability of the user.

Further, the storage unit 306 stores combination of a temperature setting value (or an output setting value) and a time setting value that are input by the user in advance, as an arbitrary setting value. The GUI display unit 304 displays an icon (image) associated with the arbitrary setting value stored in the storage unit 306 on a bi-axial coordinate system composed of the time setting axis 202 and the temperature setting axis 203 (the output setting axis 208 in the microwave function). This makes it easy for the user to use an arbitrary setting value frequently used by the user. This is advantageous in enhancing the usability of the user.

In the first embodiment, the GUI operation display portion 201 is composed of a capacitance type touch panel. The present disclosure, however, is not specifically limited to the above. The GUI operation display portion 201 may be composed of a touch panel of another type, such as a resistive film type touch panel on which the user can perform a touch operation or a drag operation.

Further, the scale of the time setting axis 202 is indicated every 5 minutes, and the scale of the temperature setting axis 203 is indicated every 100° C. in a GUI image in which each of the setting axes is indicated. The scale of the time setting axis 202 and the scale of the temperature setting axis 203 are not limited to the aforementioned unit widths.

Further, the GUI display unit 304 may be configured such that the user is allowed to horizontally scroll a liquid crystal display screen when the finger is out of the screen in setting a time. Further, the GUI display unit 304 may change the scale of a time to be displayed in such a manner that the scale of the time setting axis 202 is displayed within the screen.

Further, the operation device (operation display unit 4) in the first embodiment may be a smartphone, a tablet computer, or a personal computer (PC) with which the user can perform a touch operation for wireless communication. In this case, the household appliance can be remotely operated. This is advantageous in enhancing the usability of the user.

(Second Embodiment)

The external appearance of a microwave oven in the second embodiment is the same as the external appearance of the microwave oven in the first embodiment, and therefore, repeated description thereof is omitted herein.

Figure 15:
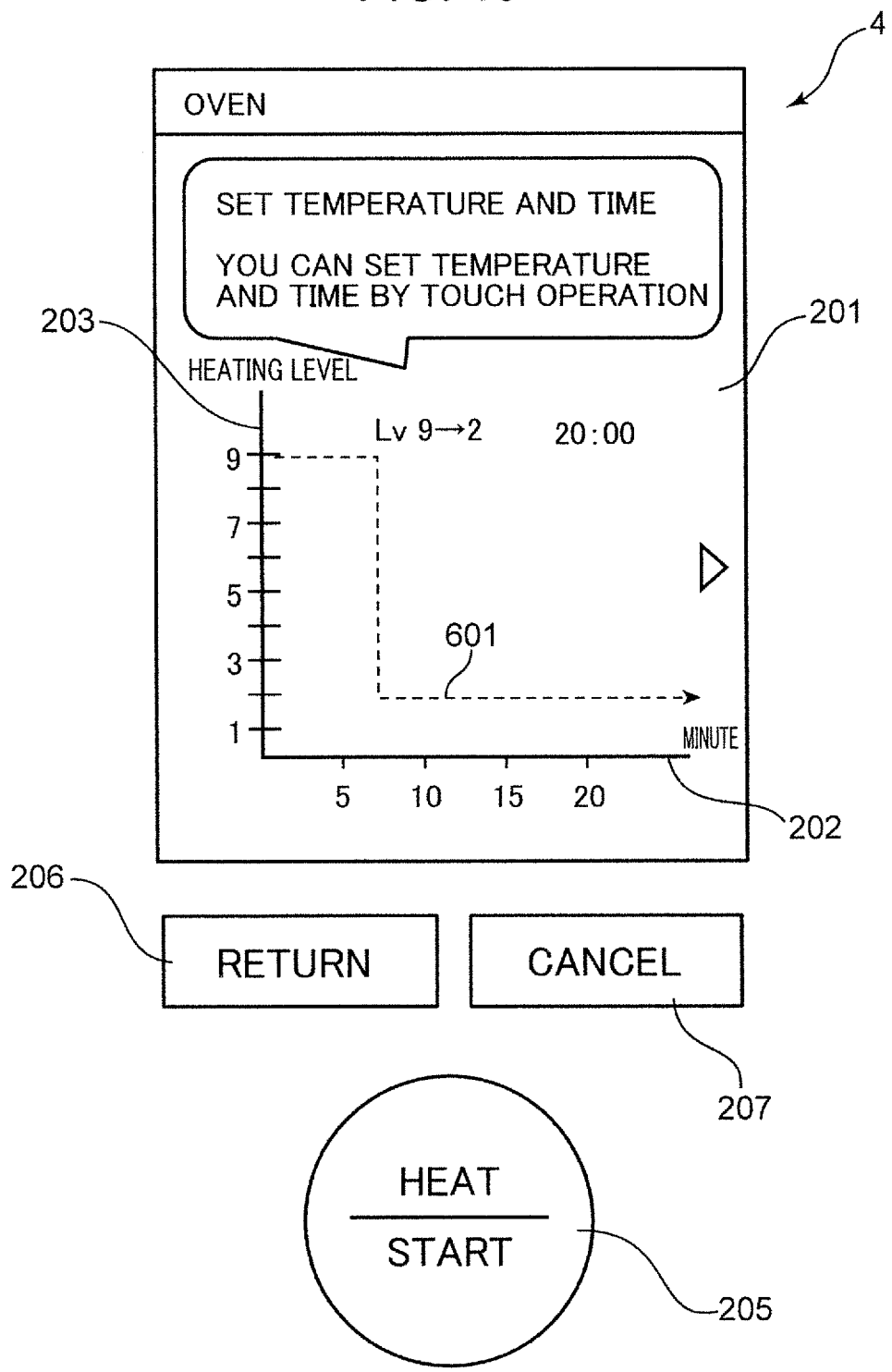
FIG. 15 is a diagram illustrating a configuration of an operation display unit of a microwave oven in a second embodiment of the invention.
Figure 16:
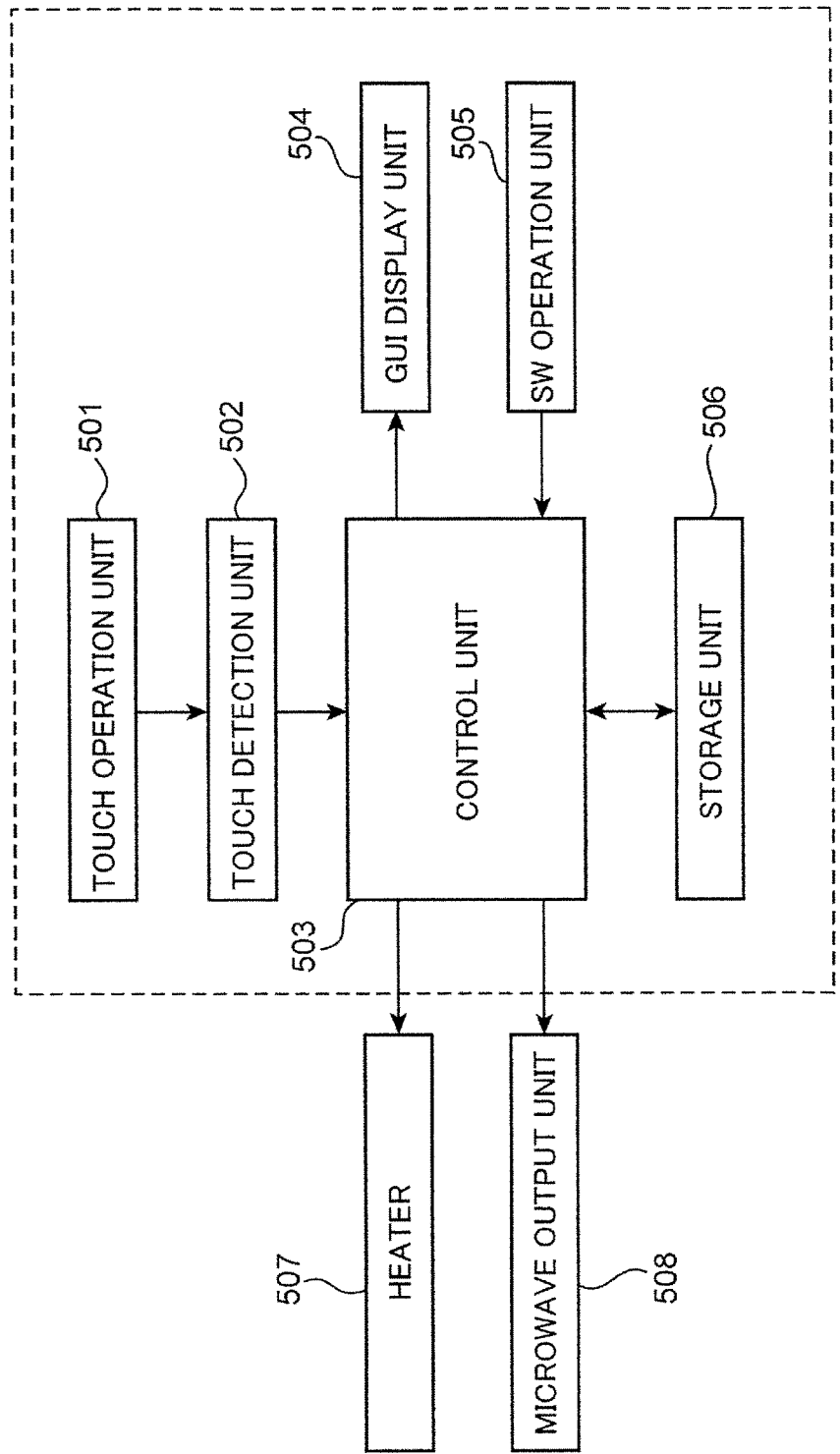
FIG. 16 is a block diagram illustrating a configuration of the operation display unit in the second embodiment of the invention.

FIG. 15 is a diagram illustrating a configuration of an operation display unit of the microwave oven in the second embodiment of the invention. FIG. 16 is a block diagram illustrating a configuration of the operation display unit in the second embodiment of the invention. The configuration of the second embodiment is described using FIG. 1, FIG. 15, and FIG. 16. In the second embodiment, a microwave oven is described as an example of a household appliance provided with an operation device. The household appliance, however, is not limited to a microwave oven.

Next, an external appearance configuration of an operation display unit 4 is described using FIG. 15. The operation display unit 4 illustrated in FIG. 15 is provided with a GUI operation display portion 201, a start key 205, a return key 206, and a cancel key 207. A temperature setting axis 202, a temperature setting axis 203, and a guide support line 601 are displayed on the GUI operation display portion 201.

The GUI operation display portion 201 is composed of a full-dot liquid crystal display, and a capacitance type touch panel. A heating time and a heating temperature are displayed in the form of a graph, while using the time setting axis 202 as a horizontal axis, and using the temperature setting axis 203 as a vertical axis. The user is allowed to draw a track with a single stroke by a drag operation of moving a certain area in an orthogonal coordinate system defined by the time setting axis 202 and the temperature setting axis 203 in a state that a predetermined object is in contact with the GUI operation display portion 201 for setting a heating operation of the microwave oven.

The time setting axis 202 is a coordinate axis for use in time settings to be displayed on the GUI operation display portion 201. Scales such as 5, 10, 15, 20 (MIN) are formed on the time setting axis 202. Further, when the user intends to display the scales in a right region adjacent to the right end of the time setting axis 202, specifically, intends to display the times longer than 20 MIN illustrated in FIG. 15, the user is allowed to scroll the graph portion. The scales differ depending on a heating mode such as a microwave function, an oven function, a grill function, a steam function, or a fermentation function. It is possible to change the fineness of scale (not illustrated).

The temperature setting axis 203 is a coordinate axis for use in temperature settings to be displayed on the GUI operation display portion 201. Scales such as 1, 3, 5, 7, and 9 (LEVEL) are formed on the temperature setting axis 203. Further, when the user intends to display the scales in an upper region adjacent to the upper end of the temperature setting axis 203, specifically, intends to display the levels higher than the heating level 9 illustrated in FIG. 15, the user is allowed to scroll the graph portion.

The scales differ depending on a heating mode such as a microwave function, an oven function, a grill function, a steam function, or a fermentation function. When the heating mode is an oven function or a fermentation function, the scales represent temperatures. When the heating mode is a microwave function, the scales represent output powers (W) of microwave energy.

The guide support line 601 is a line for guiding the user in setting a temperature setting value and a time setting value. The user moves a predetermined object on the orthogonal coordinate system defined by the time setting axis 202 and the temperature setting axis 203 in contact with the GUI operation display portion 201. According to this configuration, the track of a touch position of the predetermined object is set as a temperature setting value and a time setting value.

The start key 205 is a button for use in starting heat cooking by the temperature setting value and the time setting value that are set and determined on the GUI operation display portion 201.

The return key 206 is a button for use in returning a GUI display to be shifted on the GUI operation display portion 201 or a setting determined on the GUI operation display portion 201 to the immediately preceding setting, and is a button for use in returning a currently displayed screen to the immediately preceding screen.

The cancel key 207 is a button for use in canceling setting values that are successively set on the GUI operation display portion 201, or a button for use in stopping a heating operation after the heating operation is started.

The start key 205, the return key 206, and the cancel key 207 are composed of independent keys such as tact switches or capacitance type touch switches.

Next, a functional configuration of the operation display unit 4 is described using FIG. 16.

The operation display unit 4 is provided with a touch operation unit 501, a touch detection unit 502, a control unit 503, a GUI display unit 504, a switch (SW) operation unit 505, a storage unit 506, a heater 507, and a microwave output unit 508. These constituent elements are cooperated with each other to implement the constituent elements as the operation display unit 4.

The operation display unit 4 is provided with, as hardware components, a microcomputer, a full-dot liquid crystal display, a capacitance type touch panel, a capacitance type touch sensor IC, and switches. The hardware components, and software components which operate the microcomputer are cooperated with each other.

The touch operation unit 501 is composed of e.g. a capacitance type touch panel. When the user's finger touches the touch panel, the electrostatic capacitance changes, and a change in the electrostatic capacitance is detected by the touch detection unit 502 to be described later.

The touch detection unit 502 is a sensor IC which detects a change in the electrostatic capacitance of the touch operation unit 501. The touch detection unit 502 outputs a detected amount of change in the electrostatic capacitance and a detected coordinate.

The control unit 503 is composed of a microcomputer and software components, and acquires detection information of various sensors, and setting values of the operation display unit 4. As described in the embodiment, when an operation device (operation display unit 4) is installed in a microwave oven, the control unit 503 drives a magnetron which outputs microwave energy for heating, or drives a heater which heats the interior of the microwave oven, and controls the microwave oven. The microcomputer composing the control unit 503 may be one or more.

The GUI display unit 504 is composed of e.g. a full-dot liquid crystal display. The control unit 503 generates a GUI image to be rendered in a video RAM (Random Access Memory), and outputs the generated GUI image to the liquid crystal display (GUI display unit 504) at a predetermined timing interval. The GUI display unit 504 displays the GUI image output by the control unit 503.

The SW operation unit 505 is composed of e.g. tact switches (SW). The SW operation unit 505 is composed of a start key for use in designating start of a heating operation, a return key for use in returning a currently displayed screen to the immediately preceding screen, and a cancel key for use in canceling the input contents or stopping a heating operation.

The storage unit 506 is composed of a memory such as an ROM (Read Only Memory) or an RAM. The storage unit 506 stores a standard or default setting value frequently used for each heating mode (combination of a temperature setting value and a time setting value, or combination of an output setting value and a time setting value) or an arbitrary setting value frequently used by the user. The arbitrary setting value is stored in an RAM or in a rewritable ROM (e.g. a Flash ROM or an EEPROM) as necessary when the user operates the operation display unit 4.

The heater 507 is composed of a heater for heating in oven cooking. The control unit 503 controls the electric power to be supplied to the heater 507, and adjusts and controls the temperature in oven cooking.

The microwave output unit 508 is composed of a magnetron which outputs microwave energy for microwave cooking. The control unit 503 adjusts and controls the microwave energy to be output from the microwave output unit 508.

The operation device in the second embodiment is constituted by the touch operation unit 501, the touch detection unit 502, the control unit 503, the GUI display unit 504, the SW operation unit 505, and the storage unit 506 indicated by the dotted line portion in FIG. 16.

The touch operation unit 501 accepts a track of a touch position of a predetermined object as an input of a power setting value and an input of a time setting value by a user's operation of moving the predetermined object on the orthogonal coordinate system in contact with the GUI display portion 504. The storage unit 506 stores a predetermined track (guide support line 601) on the orthogonal coordinate system. The GUI display unit 504 displays the predetermined track (guide support line 601) stored in the storage unit 506 before the predetermined object touches the GUI display unit 504.

Alternatively, the GUI display unit 504 may display the predetermined track (guide support line 601) stored in the storage unit 506 after the power supply is turned on, or after a door 3 is closed, or after a heating mode is selected.

Next, an operation of setting and changing a temperature setting value and a time setting value by drawing a track on the GUI operation display portion 201 with a finger or with a pen-type input device such as a stylus pen in oven cooking by the microwave oven in the second embodiment is described.

Figure 17:
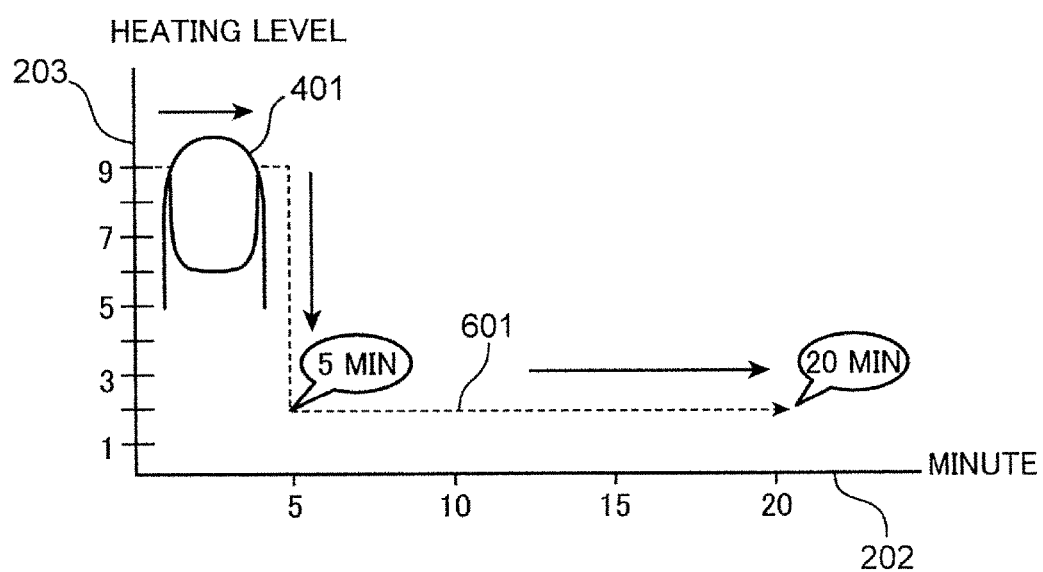
FIG. 17 is a diagram illustrating an example of a display screen before a temperature setting value (heating level) and a time setting value in oven cooking by the microwave oven in the second embodiment are set.
Figure 18:
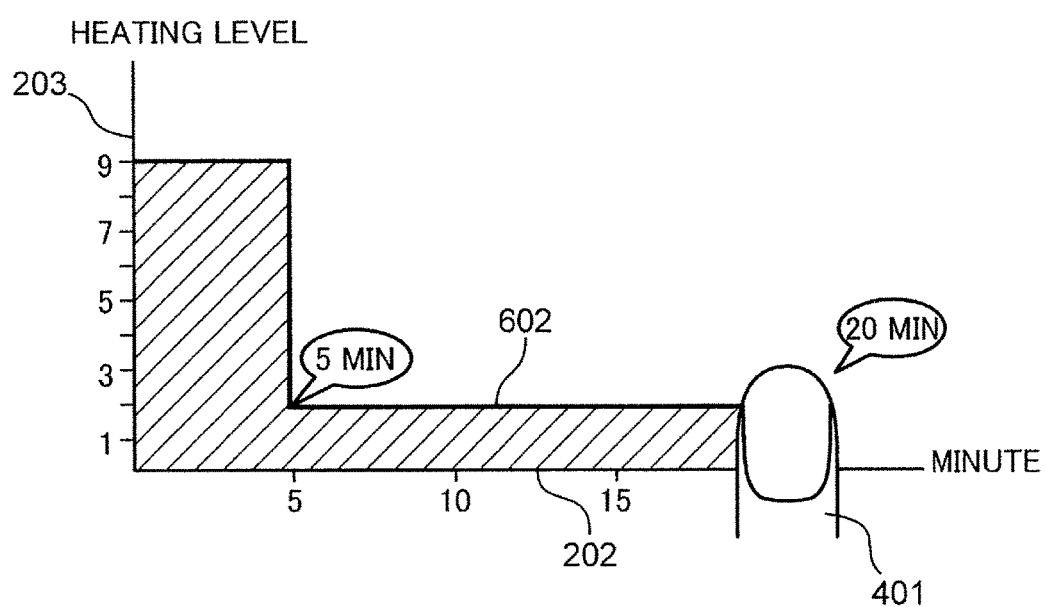
FIG. 18 is a diagram illustrating an example of a display screen after the temperature setting value and the time setting value in oven cooking by the microwave oven in the second embodiment are set.
Figure 19:
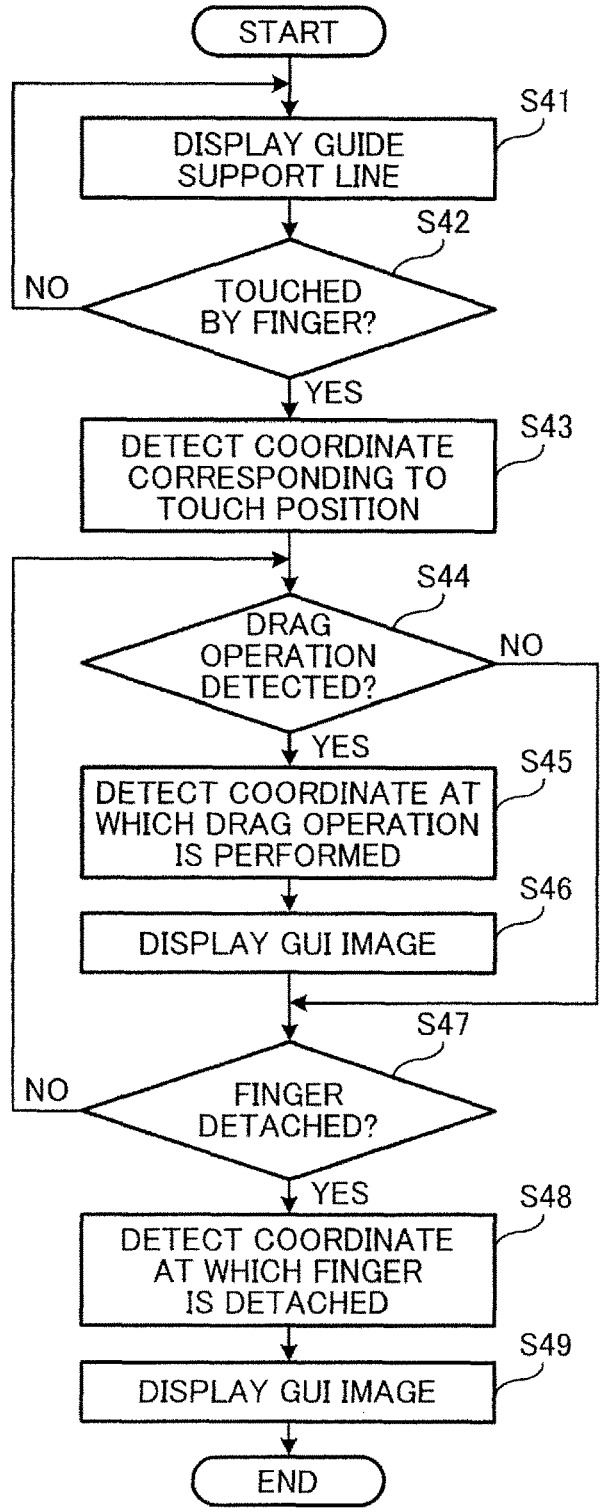
FIG. 19 is a flowchart for describing an operation of setting a temperature setting value and a time setting value by a drag operation in the second embodiment.

FIG. 17 is a diagram illustrating an example of a display screen before a temperature setting value (heating level) and a time setting value are set in oven cooking by the microwave oven in the second embodiment. FIG. 18 is a diagram illustrating an example of a display screen after the temperature setting value and the time setting value are set in oven cooking by the microwave oven in the second embodiment. FIG. 19 is a flowchart for describing an operation of setting a temperature setting value and a time setting value by a drag operation in the second embodiment. The operation of setting a temperature setting value and a time setting value is described using FIG. 17 to FIG. 19.

In Step S41, the GUI display unit 504 displays the guide support line 601 which aids a user's operation and which indicates a timewise change of a temperature setting value on an orthogonal coordinate system, in which the vertical axis represents a temperature setting value, and the horizontal axis represents a time setting value. The storage unit 506 stores in advance the guide support line 601. The control unit 503 reads the guide support line 601 from the storage unit 506, generates a GUI image, in which the guide support line 601 is displayed on the orthogonal coordinate system, and outputs the generated GUI image to the GUI display unit 504.

When a setting in oven cooking is changed, as illustrated in FIG. 17, the GUI display unit 504 displays the guide support line 601 indicated by the dotted line in the area surrounded by the time setting axis 202 and the temperature setting axis 203. The user performs a drag operation of moving the finger 401 rightward along the guide support line 601.

With use of the guide support line 601, the user who is unfamiliar with the operation of setting a time and a temperature by himself or herself is allowed to know the setting contents to be input with a single stroke to some extent. This makes it easy for the user to perform an input operation with a single stroke. The guide support line 601 is displayed before a temperature setting value and a time setting value are set in oven cooking.

The guide support line 601 indicated by the dotted line is used for guiding the user, and is not configured to force the user to track the dotted line by the finger.

The guide support line 601 may be displayed in a form other than the dotted line. As will be described later referring to FIG. 18, it is desirable to display the guide support line 601 in a display form other than the display form of a track (indicated by the thick solid line) actually tracked by the user's finger 401 in view of easiness of viewing.

Further, the guide support line 601 indicated by the dotted line differs depending on an object to be cooked in oven cooking, and is displayed in a form (cooking step) depending on a cooking object designated by the user. Preferably, the predetermined track (guide support line 601) to be displayed on the GUI display unit 504 before a predetermined object touches the GUI display unit 504 may differ depending on an object to be controlled by the household appliance.

In this case, the storage unit 506 stores the guide support line 601 in association with an object to be controlled by the household appliance. For instance, the storage unit 506 may store the guide support line 601 in association with a cooking menu such as cooking hamburger patties, or may store the guide support line 601 in association with the food such as frozen cooked rice. The user inputs information for specifying the food put in the interior of the microwave oven in putting the food in the interior of the microwave oven. Then, the control unit 503 reads the guide support line 601 associated with the input food, and displays the guide support line 601 on the GUI display unit 504. The microwave oven may be provided with a photographing unit which photographs the food put in the interior of the microwave oven, and the control unit 503 may automatically specify the guide support line 601 associated with the food photographed by the photographing unit.

Further, the guide support line 601 indicated by the dotted line may be displayed in a form (cooking step) set by the user last time. Specifically, the storage unit 506 may store the track of a touch position of a predetermined object set by the user last time. Alternatively, the GUI display unit 504 may display the track stored in the storage unit 506 last time as the guide support line 601.

Further, the guide support line 601 may average a plurality of forms (cooking steps) set by the user in the past, and may display the result of averaging. Specifically, the storage unit 506 may store a plurality of tracks of touch positions of a predetermined object set by the user in the past. Then, the control unit 503 may average the tracks stored in the storage unit 506. Then, the GUI display unit 504 may display the average track as the guide support line 601.

Specifically, the GUI display unit 504 displays a setting value at a current point of time in the area surrounded by the time setting axis 202 and the temperature setting axis 203. In the second embodiment, the temperature setting value is displayed by nine heating levels. The guide support line 601 at a current point of time is displayed such that a portion of the guide support line 601 corresponding to five minutes from heating start is set to the heaving level 9, and a portion of the guide support line 601 corresponding to fifteen minutes thereafter is set to the heating level 2.

Subsequently, in Step S42, the touch detection unit 502 judges whether the user's finger touched the touch panel (touch operation unit 501). When the touch operation unit 501 is touched by the finger, the touch detection unit 502 detects the presence of a touch operation. When it is judged that the user's finger does not touch the touch panel (NO in Step S42), the routine returns to Step S41.

On the other hand, when it is judged that the user's finger touched the touch panel (YES in Step S42), in Step S43, the touch detection unit 502 detects the coordinate corresponding to the touch position, and outputs the detected coordinate to the control unit 503.

Subsequently, in Step S44, the touch detection unit 502 judges whether a drag operation is detected. The drag operation is an operation of moving the finger in contact with the touch panel. When the finger 401 is dragged along the direction of the arrow illustrated in FIG. 17, the touch detection unit 502 detects a drag operation. When it is judged that a drag operation is not detected (NO in Step S44), the routine proceeds to Step S47.

On the other hand, when it is judged that a drag operation is detected (YES in Step S44), in Step S45, the touch detection unit 502 detects the coordinate corresponding to the position at which a drag operation is performed, and outputs the detected coordinate to the control unit 503.

When the finger 401 is dragged along the direction of the arrow illustrated in FIG. 17, the touch detection unit 502 detects the coordinate corresponding to the position on the touch operation unit 501 at which the finger 401 touches at a predetermined time interval (e.g. every several ten milliseconds), and outputs the detected coordinates to the control unit 503. The control unit 503 generates a GUI image in accordance with the acquired coordinates corresponding to the touch positions. The control unit 503 generates a GUI image in which a straight line connecting two coordinates detected at a predetermined time interval is drawn during a time when the user's finger is moved in contact with the touch operation unit 501. According to this configuration, a track of movement of the user's finger is displayed by the solid line.

Subsequently, in Step S46, the GUI display unit 504 displays a GUI image generated by the control unit 503 at a timing interval for updating the screen. The user moves the finger 401 in contact with the screen to the position corresponding to a temperature and a time which the user intends to set, and detaches the finger 401 from the screen at the position.

Subsequently, in Step S47, the touch detection unit 502 judges whether the finger 401 is detached from the screen. The touch detection unit 502 detects that the finger 401 is detached from the screen. When it is judged that the finger 401 is not detached from the screen (NO in Step S47), the routine returns to Step S44.

On the other hand, when it is judged that the finger 401 is detached from the screen (YES in Step S47), in Step S48, the touch detection unit 502 detects a coordinate corresponding to the position at which the finger 401 is detached from the screen. The touch detection unit 502 outputs release information indicating that the finger 401 is detached from the screen, and the coordinate corresponding to the position at which the finger 401 is detached from the screen to the control unit 503.

Subsequently, in Step S49, the control unit 503 generates a GUI image including the changed temperature setting value and the changed time setting value as a result of movement of the finger 401, and the GUI display unit 504 displays the GUI image generated by the control unit 503. As illustrated in FIG. 18, a track 602 of a touch position of the finger 401 is displayed by a user's operation of moving the finger 401 on the orthogonal coordinate system in contact with the touch operation unit 501. Further, the control unit 503 simultaneously stores the changed temperature setting value and the changed time setting value in the storage unit 506. In this case, the storage unit 506 stores setting values in a series of heating operations of heating an object at the heating level 9 from zero to five minutes, and thereafter, heating the object at the heating level 2 from five to twenty minutes.

Preferably, the display form of a predetermined track (guide support line 601) to be displayed before a predetermined object touches the GUI display unit 504 may be different from the display form of the track 602 of a touch position of the predetermined object to be input by the touch operation unit 501.

Thereafter, the SW operation unit 505 accepts pressing of the start key 205. When the start key 205 is pressed, the control unit 503 controls a heating operation of the heater 507 for oven cooking at the temperature setting value and the time setting value stored in the storage unit 506.

As illustrated in FIG. 17, the GUI display unit 504 displays the guide support line 601 when the user sets a temperature setting value and a time setting value. The present disclosure, however, is not specifically limited. The GUI display unit 504 may not display the guide support line 601 as a default display.

Further, the touch detection unit 502 converts a track of a predetermined object touched on the GUI display unit 504 into a coordinate value for each zone. When a change in the coordinate values adjacent to each other in a horizontal direction is equal to or smaller than a predetermined value, an input is accepted based on an assumption that the coordinate values adjacent to each other in the horizontal direction remain unchanged. When a change in the coordinate values adjacent to each other in a vertical direction is equal to or smaller than a predetermined value, an input is accepted based on an assumption that the coordinate values adjacent to each other in the vertical direction remain unchanged. Each zone is a time zone during which touch of a predetermined object on a screen is detected by a predetermined distance in a horizontal direction, by a predetermined distance in a vertical direction, by a predetermined length, or by the touch detection unit 502.

Specifically, the touch detection unit 502 detects the coordinate corresponding to the position on the touch operation portion 501 at which the finger 401 touches at a predetermined time interval (every several ten milliseconds). The touch detection unit 502 compares a first coordinate detected at a first time, and a second coordinate detected at a second time earlier than the first time by a predetermined time period (several ten milliseconds). As a result of the comparison, the difference value between the value of the first coordinate in the horizontal direction, and the value of the second coordinate in the horizontal direction is equal to or smaller than a predetermined value, the touch detection unit 502 replaces the value of the first coordinate in the horizontal direction by the value of the second coordinate in the horizontal direction. Further, when the difference value between the value of the first coordinate in the vertical direction and the value of the second coordinate in the vertical direction is equal to or smaller than a predetermined value, the touch detection unit 502 replaces the value of the first coordinate in the vertical direction by the value of the second coordinate in the vertical direction.

According to this configuration, the track is recognized as a straight line, even if the track input by a single stroke has a distorted shape. This makes it possible to optimize the setting value of a cooking device, and makes it easy for the user to input a setting value without taking into account the shape of the track.

As described above, according to the second embodiment, the GUI display unit 504 horizontally displays the time setting axis 202, and vertically displays the temperature setting axis 203. The touch operation unit 501 accepts a touch operation within a displayed touch operation area. This allows for the user to simultaneously input a temperature setting value (or an output setting value) and a time setting value by a one-time touch operation in heat cooking. This makes it possible to reduce the number of setting operations of the microwave oven. This is advantageous in enhancing the operability and the usability of the user.

Further, the touch operation unit 501 simultaneously accepts an input of a temperature setting value (or an output setting value) and an input of a time setting value by a one-time drag operation. This allows for the user to simultaneously and easily set two parameters in heat cooking by the microwave oven, while allowing the user to visually check the setting and changing operations. This is advantageous in enhancing the operability and the usability of the user.

Further, the touch operation unit 501 allows for the user to simultaneously input a power and a time by accepting a touch operation to an arbitrary position on a bi-axial coordinate system composed of the time setting axis 202 and the temperature setting axis 203 (an output setting axis in the microwave function). According to this configuration, the user can simultaneously set a temperature (or an output power) and a time in heat control of the microwave oven by directly touching the position corresponding to combination of intended setting values. This makes it possible to reduce the number of setting operations. This is advantageous in enhancing the operability and the usability of the user.

In the second embodiment, the GUI operation display portion 201 is composed of a capacitance type touch panel. The present disclosure, however, is not specifically limited to the above. The GUI operation display portion 201 may be composed of a touch panel of another type, such as a resistive film type touch panel on which the user can perform a touch operation or a drag operation.

Further, the scale of the time setting axis 202 is indicated every 5 minutes, and the scale of the temperature setting axis 203 is indicated in terms of levels in a GUI image, in which each of the setting axes is indicated. The scale of the time setting axis 202 and the scale of the temperature setting axis 203 are not limited to the aforementioned unit widths.

Further, the GUI display unit 504 may be configured such that the user is allowed to horizontally scroll a liquid crystal display screen when the finger is out of the screen in setting a time. Further, the GUI display unit 504 may change the scale of a time to be displayed in such a manner that the scale of the time setting axis 202 is displayed within the screen.

Further, the operation device (operation display unit 4) in the second embodiment may be a smartphone, a tablet computer, or a personal computer (PC) with which the user can perform a touch operation for wireless communication. In this case, a household appliance can be remotely controlled. This is advantageous in enhancing the usability of the user.

Further, the household appliance provided with the operation device (operation display unit 4) of the first (second) embodiment is not limited to a microwave oven. The household appliance may be a household appliance in which a power and a time are set for an object to be controlled. Examples of the household appliance other than a microwave oven may be a washing and drying machine, a dish washer/dryer, a microwave oven, an oven, a rice cooker, an IH (Induction Heating) cooker, an air conditioner, a heath-related equipment such as a massage chair, and a cleaning robot. Further, the operation device of the first (second)

embodiment may be an operation device for an FA (Factory Automation) device or for medical equipment.

Figure 20:
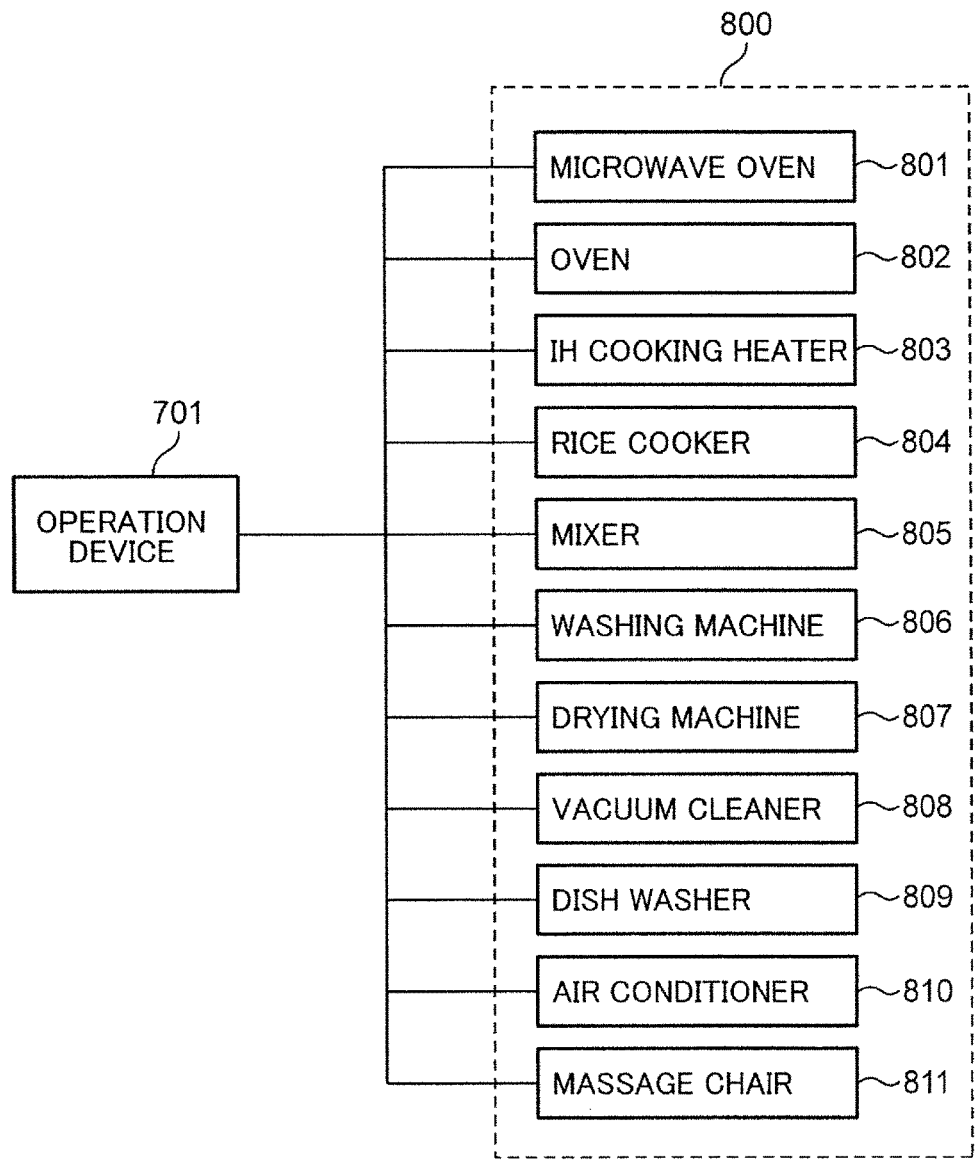
FIG. 20 is a diagram illustrating an example of a device control system provided with an operation device, and a plurality of household appliances to be operated by the operation device.

FIG. 20 is a diagram illustrating an example of a device control system provided with an operation device, and a plurality of household appliances to be operated by the operation device.

As illustrated in FIG. 20, the device control system is provided with an operation device 701, and a plurality of household appliances 800. The operation device 701 is an operation device (operation display unit 4) in the first (second) embodiment. The operation device 701 remotely operates the household appliances 800.

The household appliances 800 include a microwave oven 801, an oven 802, an IH cooker 803, a rice cooker 804, a mixer 805, a washing machine 806, a drying machine 807, a vacuum cleaner 808, a dish washer 809, an air conditioner 810, and a massage chair 811.

The operation device 701, and each of the household appliances 800 are communicatively connected via a network. Examples of the network are a local area network (LAN) and the Internet.

FIG. 21 is a diagram illustrating an example of a power setting value to be controlled by each of the household appliances.

As illustrated in FIG. 21, the power setting value to be controlled by the microwave oven 801 is a microwave output value. The power setting value to be controlled by the oven 802 is a heating power or a temperature. The power setting value to be controlled by the IH cooker 803 is a heating power or a temperature. The power setting value to be controlled by the rice cooker 804 is a heating power or a temperature. The power setting value to be controlled by the mixer 805 is a rotational speed. The power setting value to be controlled by the washing machine 806 is a rotational speed of a washing tub, a water amount, or a water temperature. The power setting value to be controlled by the drying machine 807 is an output value or a temperature of a heater. The power setting value to be controlled by the vacuum cleaner 808 is a suction power. The power setting value to be controlled by the dish washer 809 is a water amount or a water temperature. The power setting value to be controlled by the air conditioner 810 is a temperature or an air volume. The power setting value to be controlled by the massage chair 811 is a level of massage.

The aforementioned embodiments mainly include the following features.

An operation device according to an aspect of the invention is an operation device for operating a household appliance. The operation device is provided with a display unit which displays a power setting value for defining an operation power of the household appliance, and a time setting value for defining an operation time of the household appliance on an orthogonal coordinate system; and an operation unit which simultaneously accepts an input of the power setting value and an input of the time setting value to be displayed on the display unit by an operation of letting a predetermined object touch the display unit.

According to the aforementioned configuration, the power setting value for defining the operation power of the household appliance, and the time setting value for defining the operation time of the household appliance are set on the orthogonal coordinate system by the display unit; and an input of the power setting value and an input of the time setting value to be displayed on the display unit are simultaneously accepted by the operation of letting the predetermined object touch the display unit by the operation unit.

Thus, the user can easily set the power setting value for defining the operation power of the household appliance, and the time setting value for defining the operation time of the household appliance with a less number of operations. This is advantageous in enhancing the usability of the user.

Further, in the operation device, preferably, one of a vertical axis and a horizontal axis on the orthogonal coordinate system may represent the power setting value, and the other of the vertical axis and the horizontal axis may represent the time setting value, and the operation unit may simultaneously accept an input of the power setting value and an input of the time setting value by an operation of dragging an intersection point between the power setting value and the time setting value on the orthogonal coordinate system.

According to the aforementioned configuration, performing the operation of dragging the intersection point between the power setting value and the time setting value on the orthogonal coordinate system makes it possible to simultaneously accept an input of the power setting value and an input of the time setting value. Thus, the user can simultaneously set the power setting value and the time setting value while visually checking the power setting value and the time setting value. This is advantageous in enhancing the operability and the usability of the user.

Further, in the operation device, preferably, one of a vertical axis and a horizontal axis on the orthogonal coordinate system may represent the power setting value, and the other of the vertical axis and the horizontal axis may represent the time setting value. The operation unit may simultaneously accept an input of the power setting value and an input of the time setting value by an operation of touching an arbitrary position on the orthogonal coordinate system. The display unit may display the power setting value and the time setting value in such a manner that a touch position to be input by the operation unit coincides with an intersection point between the power setting value and the time setting value.

According to the aforementioned configuration, performing the operation of touching the arbitrary position on the orthogonal coordinate system makes it possible to simultaneously accept an input of the power setting value and an input of the time setting value, and the power setting value and the time setting value are displayed in such a manner that the touch position coincides with the intersection point between the power setting value and the time setting value.

Thus, the user can simultaneously set the power setting value and the time setting value, while visually checking the power setting value and the time setting value. This is advantageous in enhancing the operability and the usability of the user.

Further, in the operation device, preferably, the operation unit may accept a track of a touch position of the predetermined object as an input of the power setting value and an input of the time setting value by an operation of moving the predetermined object on the orthogonal coordinate system in contact with the display unit.

According to the aforementioned configuration, the track of the touch position of the predetermined object is accepted as an input of the power setting value and an input of the time setting value by the operation of moving the predetermined object on the orthogonal coordinate system in contact with the display unit.

Thus, the user can easily set the power setting value for defining the operation power of the household appliance, and the time setting value for defining the operation time of the household appliance by an intuitive and simple operation of designating the power setting value and the time setting value by a single stroke with use of the predetermined object. This is advantageous in enhancing the usability of the user.

Further, preferably, the operation device may be further provided with a storage unit which stores a predetermined track on the orthogonal coordinate system, wherein the display unit displays the predetermined track stored in the storage unit before the predetermined object touches the display unit.

According to the aforementioned configuration, the predetermined track stored in the storage unit is displayed before the predetermined object touches the display unit. Therefore, the user can input the power setting value and the time setting value on the basis of the predetermined track to be displayed in advance. This is advantageous in enhancing the usability of the user.

Further, in the operation device, preferably, a display form of the predetermined track to be displayed before the predetermined object touches the display unit may be different from a display form of a track of a touch position of the predetermined object to be input by the operation unit.

According to the aforementioned configuration, the display form of the predetermined track to be displayed before the predetermined object touches the display unit is different from the display form of the track of the touch position of the predetermined object to be input by the operation unit.

Therefore, the user can easily discriminate the predetermined track to be displayed as a guide to the user before the predetermined object touches the display unit, and the track actually input by the user from each other. This is advantageously enhancing the visibility of the predetermined track.

Further, in the operation device, preferably, the predetermined track to be displayed before the predetermined object touches the display unit may differ depending on an object to be controlled by the household appliance.

According to the aforementioned configuration, the predetermined track to be displayed before the predetermined object touches the display unit differs depending on the object to be controlled by the household appliance. Therefore, it is possible to present the power setting value and the time setting value according to an object to be controlled by the household appliance to the user in advance. This is advantageous in enhancing the usability of the user.

Further, in the operation device, preferably, the operation unit may convert a track of the predetermined object touched on the display unit into a coordinate value for each zone. When a change in the coordinate values adjacent to each other in a horizontal direction is equal to or smaller than a predetermined value, an input may be accepted based on an assumption that the coordinate values adjacent to each other in the horizontal direction remain unchanged. When a change in the coordinate values adjacent to each other in a vertical direction is equal to or smaller than a predetermined value, an input may be accepted based on an assumption that the coordinate values adjacent to each other in the vertical direction remain unchanged.

According to the aforementioned configuration, the track of the predetermined object touched on the display unit is converted into a coordinate value for each zone. When a change in the coordinate values adjacent to each other in the horizontal direction is equal to or smaller than the predetermined value, an input may be accepted based on an assumption that the coordinate values adjacent to each other in the horizontal direction remain unchanged. When a change in the coordinate values adjacent to each other in the vertical direction is equal to or smaller than a predetermined value, an input may be accepted based on an assumption that the coordinate values adjacent to each other in the vertical direction remain unchanged.

Thus, the user can recognize the track as a straight line, even if the track of the touch position of the predetermined object has a distorted shape. This makes it possible to optimize the power setting value and the time setting value of the household appliance, and makes it easy for the user to input the power setting value and the time setting value without taking into account the shape of the track.

Further, in the operation device, preferably, the household appliance may include a heat cooker which cooks food by heating.

According to the aforementioned configuration, the user can input a power setting value and a time setting value of the heat cooker which cooks food by heating.

An operation method according to another aspect of the invention is an operation method for operating a household appliance. The operation method includes a step of causing a display unit to display a power setting value for defining an operation power of the household appliance, and a time setting value for defining an operation time of the household appliance on an orthogonal coordinate system; and a step of causing an operation unit to simultaneously accept an input of the power setting value and an input of the time setting value to be displayed on the display unit by an operation of letting a predetermined object touch the display unit.

According to the aforementioned configuration, the power setting value for defining the operation power of the household appliance, and the time setting value for defining the operation time of the household appliance are displayed on the orthogonal coordinate system by the display unit, and an input of the power setting value and an input of the time setting value to be displayed on the display unit are simultaneously accepted by the operation of letting the predetermined object touch the display unit by the operation unit.

Thus, the user can easily set the power setting value for defining the operation power of the household appliance, and the time setting value for defining the operation time of the household appliance with a less number of operations. This is advantageous in enhancing the usability of the user.

The embodiments or the examples described in the section of description of embodiments are provided to clarify the technical contents of the invention. The invention should not be construed to be limited to the embodiments or the examples. The invention may be modified in various ways as far as such modifications do not depart from the spirit and the scope of the invention hereinafter defined.

INDUSTRIAL APPLICABILITY

The operation device and the operation method of the invention are advantageous in enhancing the usability of the user, and are useful as an operation device and an operation method for operating a household appliance.

What is claimed is:

1. An operation device for operating a household appliance, comprising:
a display unit which displays a power setting value for defining an operation power of the household appliance, and a time duration setting value for defining an operation time duration of the household appliance on an orthogonal coordinate system; and
an operation unit which simultaneously accepts both a change of an input of the power setting coordinate value in a first direction and a change of an input of time duration setting coordinate value in a second direction to be displayed on the display unit by an operation of letting a predetermined object touch the display unit, wherein the first direction is one of a vertical direction or a horizontal direction and the second direction is orthogonal to the first direction, wherein:

the operation unit accepts a track of a touch position of the predetermined object as an input of the power setting value and an input of the time duration setting value by an operation of moving the predetermined object on the orthogonal coordinate system in contact with the display unit, and the operation unit converts a track of the predetermined object touched on the display unit into a coordinate value for each zone, wherein when a change in the coordinate values adjacent to each other in a horizontal direction is equal to or smaller than a predetermined value, an input is accepted based on an assumption that the coordinate values adjacent to each other in the horizontal direction remain unchanged, and when a change in the coordinate values adjacent to each other in a vertical direction is equal to or smaller than a predetermined value, an input is accepted based on an assumption that the coordinate values adjacent to each other in the vertical direction remain unchanged.

2. The operation device according to claim 1, wherein one of a vertical axis and a horizontal axis on the orthogonal coordinate system represents the power setting value, and the other of the vertical axis and the horizontal axis represents the time duration setting value, and the operation unit simultaneously accepts an input of the power setting value and an input of the time duration setting value by the operation of dragging an intersection point between the power setting value and the time duration setting value on the orthogonal coordinate system.

3. The operation device according to claim 1, wherein one of a vertical axis and a horizontal axis on the orthogonal coordinate system represents the power setting value, and the other of the vertical axis and the horizontal axis represents the time duration setting value, the operation unit simultaneously accepts an input of the power setting value and an input of the time duration setting value by an operation of touching an arbitrary position on the orthogonal coordinate system, and the display unit displays the power setting value and the time duration setting value in such a manner that a touch position to be input by the operation unit coincides with an intersection point between the power setting value and the time duration setting value.

4. The operation device according to claim 1, further comprising:

a storage unit which stores a predetermined track on the orthogonal coordinate system, wherein the display unit displays the predetermined track stored in the storage unit before the predetermined object touches the display unit.

5. The operation device according to claim 4, wherein a display form of the predetermined track to be displayed before the predetermined object touches the display unit is different from a display form of a track of a touch position of the predetermined object to be input by the operation unit.

6. The operation device according to claim 4, wherein the predetermined track to be displayed before the predetermined object touches the display unit differs depending on an object to be controlled by the household appliance.

7. The operation device according to claim 1, wherein the household appliance includes a heat cooker which cooks food by heating.

8. An operation method for operating a household appliance, comprising:

a step of causing a display unit to display a power setting value for defining an operation power of the household appliance, and a time duration setting value for defining an operation time duration of the household appliance on an orthogonal coordinate system; and a step of causing an operation unit to simultaneously both a change of an input of the power setting coordinate value in a first direction and a change of an input of the time duration setting coordinate value in a second direction to be displayed on the display unit by an operation of letting a predetermined object touch the display unit, wherein the first direction is one of a vertical direction or a horizontal direction and the second direction is orthogonal to the first direction, wherein the operation unit accepts a track of a touch position of the predetermined object as an input of the power setting value and an input of the time duration setting value by an operation of moving the predetermined object on the orthogonal coordinate system in contact with the display unit, and the operation unit converts a track of the predetermined object touched on the display unit into a coordinate value for each zone, wherein when a change in the coordinate values adjacent to each other in a horizontal direction is equal to or smaller than a predetermined value, an input is accepted based on an assumption that the coordinate values adjacent to each other in the horizontal direction remain unchanged, and when a change in the coordinate values adjacent to each other in a vertical direction is equal to or smaller than a predetermined value, an input is accepted based on an assumption that the coordinate values adjacent to each other in the vertical direction remain unchanged.

* * * * *

UNITED STATES PATENT AND TRADEMARK OFFICE
CERTIFICATE OF CORRECTION

PATENT NO. : 10,222,964 B2
APPLICATION NO. : 15/029419
DATED : March 5, 2019
INVENTOR(S) : Yasuhiro Ban et al.

Page 1 of 1

It is certified that error appears in the above-identified patent and that said Letters Patent is hereby corrected as shown below:

On the Title Page

Item (73), delete "PANASONIC IP MANAGEMENT CO., LTD." and replace with PANASONIC INTELLECTUAL PROPERTY MANAGEMENT CO., LTD.

Signed and Sealed this
Ninth Day of July, 2019

Andrei Iancu
*Director of the United States Patent and Trademark Office*